US012719856B1

(12) United States Patent
Dasarakothapalli et al.

(10) Patent No.: US 12,719,856 B1
(45) Date of Patent: Aug. 25, 2026

(54) CROSS-SERVICE AUDITABLE TRANSITIVE IDENTITY PROPAGATION

(71) Applicant: Amazon Technologies, Inc., Seattle, WA (US)

(72) Inventors: Arjun Prasad Dasarakothapalli, Mercer Island, WA (US); Ajay Radhakrishnan, Seattle, WA (US); Andrew Oppenlander, Bothell, WA (US); Ron Cully, Worley, ID (US); Hamed Seifoddini Rad, Oakville (CA); Rebecca Claire Weiss, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 8 days.

(21) Appl. No.: 18/758,205

(22) Filed: Jun. 28, 2024

Related U.S. Application Data

(60) Provisional application No. 63/602,240, filed on Nov. 22, 2023.

(51) Int. Cl.
*H04L 9/40* (2022.01)

(52) U.S. Cl.
CPC ........ *H04L 63/083* (2013.01); *H04L 63/0435* (2013.01); *H04L 63/102* (2013.01)

(58) Field of Classification Search
CPC .. H04L 63/085; H04L 63/0435; H04L 63/102
See application file for complete search history.

(56) References Cited

U.S. PATENT DOCUMENTS

| | | | | |
|---|---|---|---|---|
| 8,843,415 | B2 * | 9/2014 | Karabulut | G06F 21/335 713/152 |
| 10,374,809 | B1 | 8/2019 | Dasarakothapalli et al. | |
| 11,196,748 | B1 | 12/2021 | Croney et al. | |
| 2014/0330869 | A1 | 11/2014 | Factor et al. | |
| 2015/0112870 | A1 | 4/2015 | Nagasundaram et al. | |

(Continued)

OTHER PUBLICATIONS

Schwenkschuster, Arndt et al., "Identity Chaining Across Trust Domains", Jul. 10, 2023, downloaded from <https://datatracker.ietf.org/doc/draft-identity-chaining/00/>, 16 pages.

(Continued)

*Primary Examiner* — Khoi V Le
(74) *Attorney, Agent, or Firm* — Nicholson DeVos Webster & Elliott LLP

(57) ABSTRACT

Techniques for cross-service auditable transitive identity propagation are described. A first application seeking to access a resource managed or provided by a second application receives a first access token generated by an identity provider. The first application performs one or more token exchanges, using the first access token, to obtain a second access token generated by an identity service. The second access token includes identity information associated with a user in a directory associated with the identity service. The first application provides the second access token to the second application as part of a request to access the resource. The second application utilizes the user identity information from the second token to perform fine-grained access control and can include user identity information in logs or events enabling auditing.

20 Claims, 13 Drawing Sheets

(56) References Cited

U.S. PATENT DOCUMENTS

| | | | | |
|---|---|---|---|---|
| 2015/0373004 | A1 | 12/2015 | Hopkins et al. | |
| 2016/0028737 | A1 | 1/2016 | Srinivasan et al. | |
| 2016/0308851 | A1 | 10/2016 | Tiwari | |
| 2017/0149803 | A1 | 5/2017 | Lo et al. | |
| 2018/0018660 | A1* | 1/2018 | Gomes | H04L 63/102 |
| 2019/0295077 | A1* | 9/2019 | Mardikar | G06Q 20/401 |
| 2019/0306138 | A1 | 10/2019 | Carru et al. | |
| 2020/0242267 | A1 | 7/2020 | Weiss et al. | |
| 2020/0358752 | A1 | 11/2020 | Palmer et al. | |
| 2020/0364354 | A1 | 11/2020 | Schwartz et al. | |
| 2022/0086133 | A1 | 3/2022 | Killoran et al. | |
| 2022/0210145 | A1 | 6/2022 | Wrenbeck et al. | |
| 2023/0247087 | A1 | 8/2023 | Nagaraja et al. | |
| 2024/0171582 | A1* | 5/2024 | Edwards | H04L 63/0876 |
| 2025/0141872 | A1 | 5/2025 | Hamel et al. | |

OTHER PUBLICATIONS

Schwenkschuster, Arndt et al., "Identity Chaining Across Trust Domains", Oct. 23, 2023, downloaded from <https://datatracker.ietf.org/doc/draft-schwenkschuster-oauth-identity-chaining/00/>, 18 pages.

U.S. Appl. No. 18/758,231, U.S. Appl. No. 63/602,240, Pending.

U.S. Appl. No. 18/758,269, U.S. Appl. No. 63/602,240, Pending.

Non-Final Office Action, U.S. Appl. No. 18/758,231, Nov. 21, 2025, 24 pages.

Non-Final Office Action, U.S. Appl. No. 18/758,269, Sep. 18, 2025, 22 pages.

* cited by examiner

ACCESS TOKEN 710

```
{
    "ACTIVE": TRUE,
    "SUB": 1111-22-3333,
    "CLOUD:IDC_INSTANCE":"RESOURCE:CLOUD:SSO:::INSTANCE/SSOINS-123",
    "AUD": [DATAYEETERAPP.ID],
    "AZP": "RESOURCE:CLOUD:SSO:::RS/SSOINS-123/API:DATA-YEETER",
    "SCOPE": [
        "API:DATA-YEETER:READ-ONLY",
        "API:DATAYEETER:READ_WRITE"
    ],
    "CLOUD:IDENTITY_STORE_ID": "D-123"
}
```

ID TOKEN 715

```
{
    "SUB": "1111-22-3333",
    "CLOUD:IDC_INSTANCE":"RESOURCE:CLOUD:SSO:::INSTANCE/SSOINS-123",
    "AUD":[DATALAKEAPP.ID],
    "SCOPE": "OPENID CLOUD STS:IDENTITY_CONTEXT",
    "CLOUD:IDENTITY_STORE_ID": "D-123",
    "ACT": {
        "SUB": "DATALAKEAPP.ID"
        "ACT": {
            "SUB": "DATAWAREHOUSEAPP.ID"
        }
    }
    "STS:IDENTITY_CONTEXT": "...."
}
```

*FIG. 7*

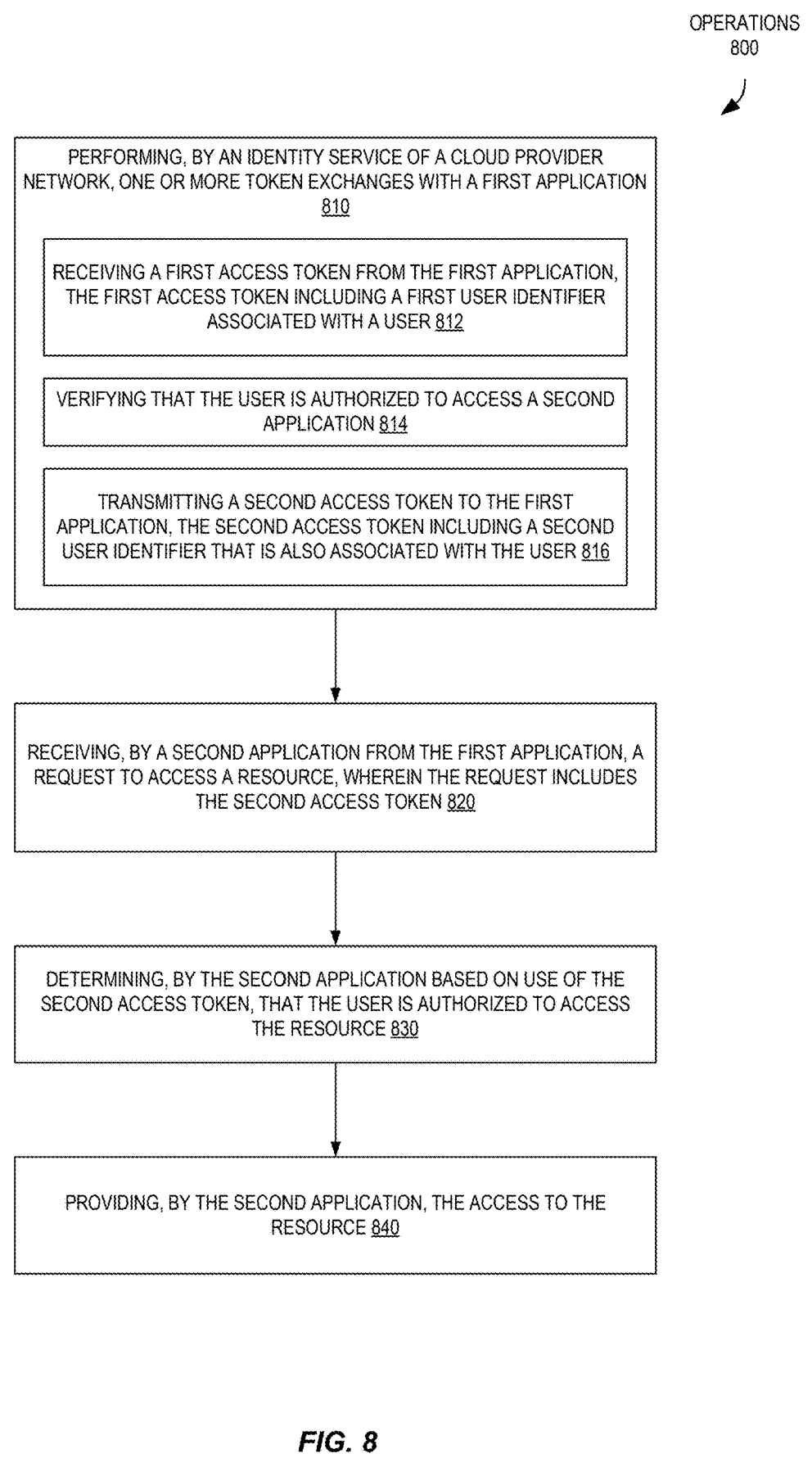

OPERATIONS 800

PERFORMING, BY AN IDENTITY SERVICE OF A CLOUD PROVIDER NETWORK, ONE OR MORE TOKEN EXCHANGES WITH A FIRST APPLICATION 810

RECEIVING A FIRST ACCESS TOKEN FROM THE FIRST APPLICATION, THE FIRST ACCESS TOKEN INCLUDING A FIRST USER IDENTIFIER ASSOCIATED WITH A USER 812

VERIFYING THAT THE USER IS AUTHORIZED TO ACCESS A SECOND APPLICATION 814

TRANSMITTING A SECOND ACCESS TOKEN TO THE FIRST APPLICATION, THE SECOND ACCESS TOKEN INCLUDING A SECOND USER IDENTIFIER THAT IS ALSO ASSOCIATED WITH THE USER 816

RECEIVING, BY A SECOND APPLICATION FROM THE FIRST APPLICATION, A REQUEST TO ACCESS A RESOURCE, WHEREIN THE REQUEST INCLUDES THE SECOND ACCESS TOKEN 820

DETERMINING, BY THE SECOND APPLICATION BASED ON USE OF THE SECOND ACCESS TOKEN, THAT THE USER IS AUTHORIZED TO ACCESS THE RESOURCE 830

PROVIDING, BY THE SECOND APPLICATION, THE ACCESS TO THE RESOURCE 840

*FIG. 8*

OPERATIONS
900

RECEIVING, AT AN IDENTITY SERVICE OF A CLOUD PROVIDER NETWORK, ONE OR MORE REQUESTS TO REGISTER A TRUSTED TOKEN ISSUER (TTI) WITH THE IDENTITY SERVICE, THE ONE OR MORE REQUESTS PROVIDING A RESOURCE IDENTIFIER ASSOCIATED WITH THE TTI AND FURTHER INCLUDING MAPPING INFORMATION IDENTIFYING AN ATTRIBUTE FROM TTI-ISSUED TOKENS AND A CORRESPONDING ATTRIBUTE FROM AN IDENTITY DATASTORE OF THE IDENTITY SERVICE, WHEREIN THE TTI IS EXTERNAL TO THE CLOUD PROVIDER NETWORK 910

RECEIVING, AT THE IDENTITY SERVICE FROM AN APPLICATION, A REQUEST TO EXCHANGE A FIRST TOKEN GENERATED BY THE TTI WITH A SECOND TOKEN TO BE GENERATED BY THE IDENTITY SERVICE, WHEREIN THE FIRST TOKEN IS ASSOCIATED WITH A FIRST USER ACCOUNT OF A DIRECTORY OF THE TTI 920

GENERATING THE SECOND TOKEN BASED AT LEAST IN PART ON THE MAPPING INFORMATION, WHEREIN THE SECOND TOKEN INCLUDES OR IS BASED ON AN IDENTIFIER OF A SECOND USER ACCOUNT OF THE IDENTITY DATASTORE 930

TRANSMITTING THE SECOND TOKEN TO THE APPLICATION 940

*FIG. 9*

RECEIVING, AT AN IDENTITY SERVICE OF A CLOUD PROVIDER NETWORK, ONE OR MORE REQUESTS ORIGINATED IN ASSOCIATION WITH A FIRST USER TO DEFINE ACCESS SCOPE INFORMATION, FOR AT LEAST A SECOND USER, PERTAINING TO A FIRST APPLICATION OF THE CLOUD PROVIDER NETWORK, WHEREIN THE ACCESS SCOPE INFORMATION PROVIDES AT LEAST A FIRST SCOPE VALUE IDENTIFYING A TYPE OF ACCESS TO THE FIRST APPLICATION THAT IS ALLOWED FOR THE SECOND USER OR A GROUP TO WHICH THE SECOND USER BELONGS 1010

RECEIVING, AT THE FIRST APPLICATION, A REQUEST TO ACCESS A RESOURCE OF THE FIRST APPLICATION THAT WAS ORIGINATED ON BEHALF OF THE SECOND USER, WHEREIN THE REQUEST INCLUDES AN ACCESS TOKEN GENERATED BY AN IDENTITY PROVIDER BASED ON AN AUTHORIZATION OF THE SECOND USER 1020

DETERMINING THAT THE REQUEST TO ACCESS THE RESOURCE IS AUTHORIZED BASED AT LEAST IN PART ON THE ACCESS TOKEN AND A DETERMINATION THAT THE FIRST SCOPE VALUE PERMITS A TYPE OF THE REQUESTED ACCESS 1030

PROVIDING, BY THE FIRST APPLICATION, THE ACCESS TO THE RESOURCE 1040

*FIG. 10*

CROSS-SERVICE AUDITABLE TRANSITIVE IDENTITY PROPAGATION

BACKGROUND

Cloud computing provides on-demand access to cloud provider network resources via the Internet or other intermediate networks. Accessing resources in a provider network can be made secure through the use of user-specified access control polices. An access control policy is an expressive specification of what resources can be accessed, by whom, and under what conditions.

Properly configured access control policies are an important part of an organization's security posture. However, it is very challenging to implement and maintain access control policies for different applications, functionalities, types of users, and use cases, especially as any or all of these can change over time.

BRIEF DESCRIPTION OF DRAWINGS

Various examples in accordance with the present disclosure will be described with reference to the drawings, in which:

FIG. 7 is a diagram illustrating an exemplary introspected access token and identity token according to some examples.

FIG. 8 is a flow diagram illustrating operations of a method for auditable transitive user identity propagation according to some examples.

FIG. 9 is a flow diagram illustrating operations of a method for cross-domain identity trust using trusted token issuers according to some examples.

FIG. 10 is a flow diagram illustrating operations of a method for authorization scope management delegation according to some examples.

DETAILED DESCRIPTION

Figure 1:
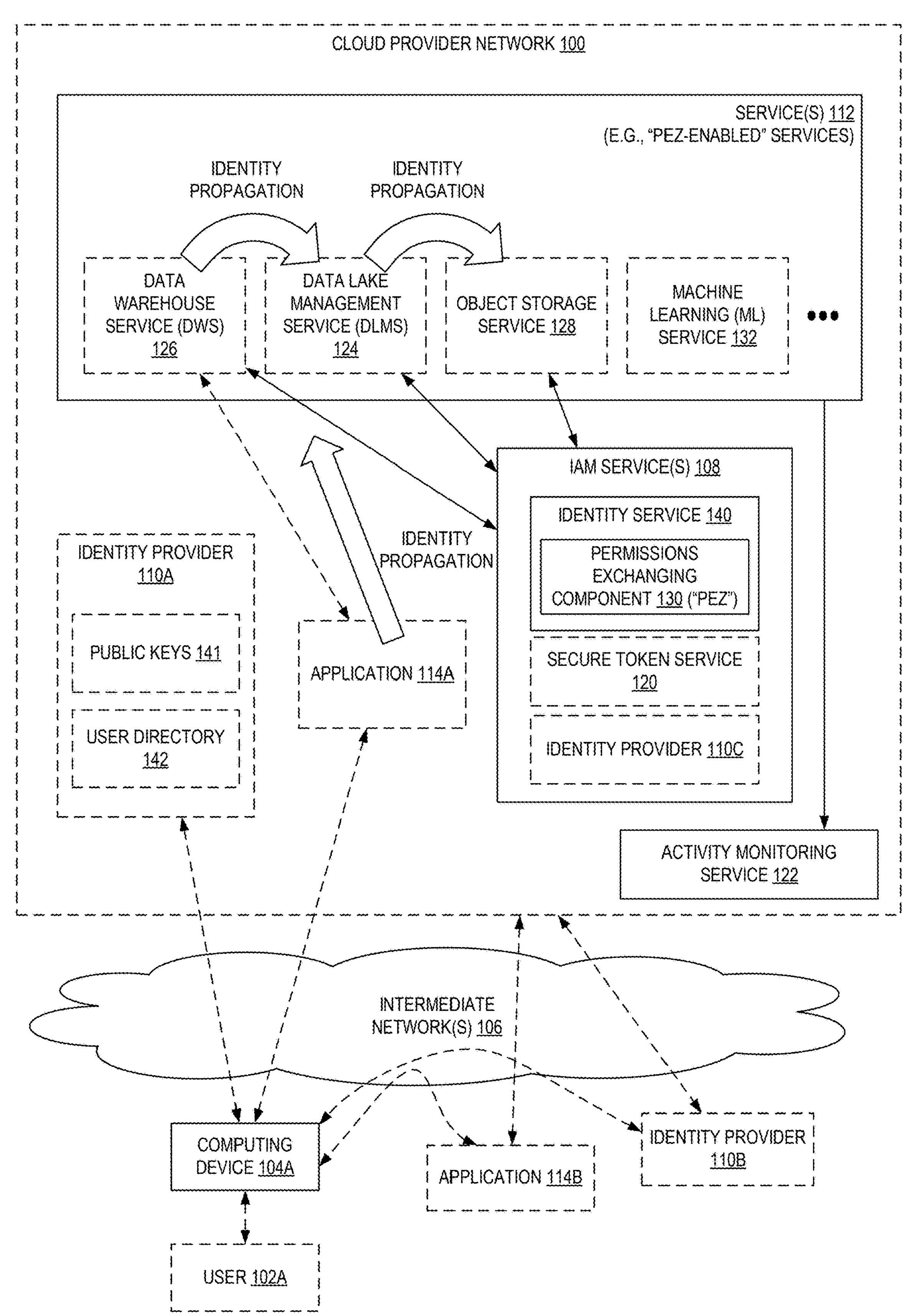
FIG. 1 is a diagram illustrating a token exchange system environment for auditable identity propagation according to some examples.

The present disclosure relates to methods, apparatus, systems, and non-transitory computer-readable storage media for auditable identity propagation via token exchange. In some examples, an Identity and Access Management (IAM) service, such as the IAM Identity Center™ offered by Amazon Web Services, Inc. (AWS), is configured with a permissions exchanging component, or "PEZ," that enables a chain of interconnected applications to control and log access based on a user's identity. In some examples, the PEZ provides functionality allowing users to authorize applications (e.g., services) to propagate their users' identities to other applications.

In some examples, the use of PEZ makes it easier for information managers to implement access control by user, or group membership, and gives auditors logs from an activity monitoring service (e.g., AWS CloudTrail™) that show which user and application accessed which information, across a chain of interconnected applications. Accordingly, users can create or connect their workforce identities in the cloud provider network, once, to manage user access to cloud accounts and applications. The PEZ can add the ability to authorize and audit how applications access information, on behalf of the applications' users. Thus, users can build applications, or utilize commercial services or solutions (e.g., such as a machine learning service like Amazon SageMaker™) that can use PEZ ("PEZ enabled applications") to propagate the application's user's identity when accessing other PEZ-enabled services, such as a cloud data warehouse service (e.g., Amazon RedShift™). Administrators of the requested service can implement access control based on the propagated user, and the service logs the user and the application that accessed the resource for auditors. PEZ can thus provide users a powerful tool to meet compliance requirements to implement user-based access control with auditing down to the person who requested the information.

Today, many regulatory agencies' and users' InfoSec compliance standards require user-based access control and auditing across interconnected business and analytics applications, that access information on behalf of the user. For example, a treasury analyst in finance may utilize a machine learning service (e.g., Amazon SageMaker Studio™) to analyze portfolio data in a data warehouse hosted by a data warehouse service (e.g., Amazon Redshift™), where the portfolio owners manage and log data warehouse data access based on the machine learning service user.

Because applications could not convey their users' identity when requesting information on behalf of the user, users may have been left with two difficult choices. First, if possible, these users would have to invest years of work to develop, maintain, train, and support a bespoke system that might vend just-in-time roles to pass between applications, as a proxy for user-based access control and auditing. However, in such cases, auditing becomes extremely hard as it requires working backwards from roles to determine who the real user was that performed some access. Alternatively, users would have to get compliance exceptions to give all users the same broad access through an application, with no audit trail, and an increased the risk of out-of-compliance data access.

Using techniques disclosed herein, users can use a cloud IAM service (or, an "identity service") to authorize PEZ enabled applications to propagate their users' identity when they access information in other authorized PEZ-enabled applications. Via such techniques, referred to also as "Identity Exchange" or "Identity Context Exchange" or "Transitive Identity Context", by building or licensing managed services that use PEZ it is easy for information managers to implement user-based access control, regardless of which application the user's request came from. Moreover, PEZ enabled services can log the user and the application they came from in an activity monitoring service so auditors can determine which users accessed what resources across interconnected applications. As PEZ can be implemented as a feature of an IAM service, it can work with users that are created in the IAM service, or users that connect from another identity provider (e.g., Microsoft Active Directory Domain Services™ (AD DS) or a SAML 2.0 identity provider, such as Microsoft Azure AD™, or Okta Universal Directory™). For example, cloud data warehouse service administrators can manage data access based on AD DS group membership, for users who sign in via Azure AD to access the cloud data warehouse service through a machine learning service, while auditors can identify which users accessed which data.

Accordingly, as customers want powerful ways to include a user's context as part of managing access across a network of connected applications, while utilizing their existing identity system for sign-in and group-based access control, implementations of PEZ disclosed herein provide a foundational step for delivering user context to applications. In some examples, this fully managed system enables users of any size to meet their compliance requirements for user-based access control and auditing across multiple applications involved in a workflow.

In some examples, with a few configuration interactions or clicks in a management application, IAM service administrators can authorize PEZ enabled applications to propagate their users' identity to other specified applications. Information managers can then use the administrative experience of PEZ enabled information services to implement and comply with user-based access control. A cloud activity monitoring service can then log user accesses automatically, for example, so auditors can generate compliance reports showing who accessed what.

Accordingly, information managers can control access by group membership (e.g., from Active Directory) and data access can be audited down to the user, while in some cases supporting a single sign-on experience, allowing such users to much more easily and completely meet their regulatory requirements. Moreover, examples disclosed herein can help solve least-privileges and audit challenges.

Various techniques and systems are described accordingly, such as to provide transitive identity propagation across a set of services, trusted token issuers registered by users to establish cross-domain trust between third-party authentication providers and a cloud identity service to enable flows that do not require an end user's interaction, and/or the delegation of OAuth scope management to enterprise administrators (instead of to end users performing actions, and thus scopes are pre-approved and the end user can perform desired actions without going through a consent experience).

FIG. 1 is a diagram illustrating an environment for auditable identity propagation via token exchange according to some examples. As shown in FIG. 1, an IAM service 108, an activity monitoring service 122, one or more other services 112 (e.g., "PEZ-enabled services"), an application 114A, and an identity provider service 110A (or "IdP" service) are shown as optionally being implemented in a multi-tenant service provider network 100. Each of these services or components can be implemented using software executed by one or more computing devices, which may be located in one or typically more geographic locations. However, in other examples, one or more or all of these services may be implemented outside a cloud provider network 100—e.g., a separate or "external" identity provider service 110B may be utilized, either instead of the in-network identity provider service 110A or together with the identity provider service 110A, such as in a federation arrangement where a third-party IdP or an organization's IdP (e.g., a corporate user directory) is used together with the identity provider service 110A or IAM service 108. As another example, an application 114B may be implemented outside of a cloud provider network 100 but still interoperate with ones of these services of the cloud provider network.

A cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure.

Users can interact with a cloud provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service (e.g., one or more of services 112) that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the cloud provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As shown, one or more PEZ-enabled services 112 are illustrated. Services 112 may include, by way of example, a data warehouse service 126 ("DWS", such as AWS Redshift™), a data lake management service 124 ("DLMS"), an object storage service 128, a machine learning (ML) service 132, etc. A DWS 126 can, for example, provide a managed data warehouse allowing users to analyze potentially exabytes of data and run complex analytical queries, e.g., to run and scale analytics in seconds on all potentially multiple types of data without having to manage the data warehouse infrastructure. A DLMS 124, for example, can help users centrally manage and scale fine-grained data access permissions and share data with confidence within and/or outside of an organization. An object storage service 128, for example, can provide data storage with built-in scalability, data availability, security, and performance, where data can be stored and protected for virtually any use case, such as data lakes, cloud-native applications, and mobile applications. In some examples, an object storage service 128 can store data as objects (e.g., files) within resources called "buckets" (or folders, collections, directories, or the like). Though these example services are shown, it is to be appreciated that other types of services 112 may be utilized, which may include more services, fewer services, different services, or the like.

In some examples, these services 112 are "PEZ-enabled" in that they have been extended or configured to be able to interact with a permissions exchanging component 130 (or "PEZ") of an IAM service 108 for the purpose of exchanging and/or validating tokens as described herein, for the purpose of allowing applications (here, services) to propagate user identities to other applications when accessing data or resources on that user's behalf In some examples, identity "receiving" applications can thus implement user or group-based access control, and an activity monitoring service 122 (e.g., AWS CloudTrail™) can log such accesses in a manner scoped specifically to the user that initiated the access. PEZ thus provides a powerful and easy way to help organizations meet their compliance requirements to manage least-privilege access based on their users' identity and group membership, and audit information access down to the user, in workflows that span multiple applications.

One use case, for example, is for analytics application suites in which one application uses other applications to access and analyze information stored elsewhere, e.g., in data lakes. Thus, a user may directly or indirectly (e.g., via a separate application 114B) "sign in" to an analytics application 114A or machine learning service 132 application to access underlying data/information via a data warehouse service 126 and/or data lake management service 124, where that user's identity (e.g., obtained from an IdP service 110A or 110B) can be safely and securely passed on between these applications/services in the chain.

Additionally, or alternatively, these techniques can be used for applications that affect or monitor physical systems, such as controlling equipment or compute services. For example, user identity can be passed on between multiple services and tracked on an individual user basis, allowing for subsequent determinations on a per-user basis, such as determining which user disabled a communications link, changed auto-scaling parameters for a compute cluster, etc.

In some examples, the PEZ component 130 works with registered cloud provider network 100 services 112 and/or third-party applications that make calls to the PEZ component 130 to request user identity propagation. The PEZ component 130 can also work with third-party solutions, built by customers or SaaS vendors, that request access to cloud provider network 100 resources. For example, a data visualization service/application could access data in a data warehouse service 126 through JDBC calls, or a PEZ-enabled third-party application could access data stored in data warehouse service 126 or object storage service 128. In some examples, the PEZ component 130 includes a way for customers to build applications that authenticate to IAM service 108 with an Open ID Connect (OIDC) authentication flow and then call the PEZ component 130 to request access to other types of applications, such a file access application that uses an object storage service 128.

In some examples, applications (e.g., one or more of services 112) are registered by a user 102A with the IAM service 108 (e.g., with an identity service 140 such as AWS IAM Identity Center™) and thereafter use PEZ component 130 specific APIs to propagate or receive user identity when interacting with other applications. For example, an identity service 140 administrator may authorize which PEZ-enabled services 112 can propagate their users' identities to other specific PEZ-enabled services 112. The authorization includes a mechanism to scope the types of requests that are permitted between applications.

Users thereafter "sign in" to authorized PEZ-enabled applications and navigate through workflows that make requests to other PEZ-enabled applications. When accessing information on behalf of a user, a PEZ-enabled application requests a digital identity (e.g., from PEZ 130) for its user's access to a PEZ-enabled application. If authorized, PEZ 130 returns a signed digital identity that the requester can send to the receiving application. The receiving application then uses PEZ 130 to verify the digital identity and the purpose for which it can be used. The receiving application then applies access control based on the involved user, their attributes, and/or group membership. In some examples, the activity monitoring service tracks (e.g., by storing events or logs emitted by these services/applications) information such as the involved user identity as it logs information accessed, giving auditors clarity on who accessed which information or resources.

For example, an IAM service 108 administrator (e.g., user 102A) authorizes a ML service 132 to make requests to a DWS 126 cluster. A data warehouse may be a collection of computing resources called nodes, which are organized into a group called a cluster, where each cluster runs an engine and contains/involves one or more databases. A same administrator or different administrator (e.g., specific to managing accesses to the DWS 126) will manage access to data based on users or group membership.

Thereafter, when users sign into the ML service 132, the ML service 132 requests permission from the PEZ 130 to propagate the user's identity to read data from the DWS 126 cluster. The IAM service 108 thus returns a digital identity with a purpose of read access from the ML service 132 to the DWS 126 cluster. Thus, the ML service 132 passes this returned identity to the DWS 126, which verifies digital identity and authorizes the access based on the purpose and the user's permissions. In some examples, the activity monitoring service 122 logs the DWS 126 data access along with the corresponding user identity.

Generally speaking, authorization is the process of determining who (typically in terms of users, roles, resources, etc.) has access to what in a multi-user system such as, for example, a multi-user application built using or upon provider network infrastructure (equivalently a "provider network application.") More specifically, authorization determines whether a principal can perform an action on a resource. For example, the principal could be a user of a provider network 100 application. In this example, authorization could involve determining whether the user has permission to perform a specific action (e.g., read) on a resource (e.g., a file) managed by the application. Common actions are create, read, update, or delete (CRUD) type actions, or application-specific actions such as ones defined by methods exposed by API calls—e.g., "ProcessPayment" or "ScheduleAppointment."

Some applications can perform authorization itself, such as by maintaining a database of users, actions, and data indicating which users can perform which actions, and utilizing a built-in authorization engine to evaluate requests based on this data. Other applications delegate authorization decisions to a dedicated (separate) authorization engine, such as one provided by an authorization service (e.g., part of an IAM service). This can allow for the application code to become simpler (through the removal of authorization logic and data from its footprint) and easier to maintain or modify. To facilitate this, an authorization engine can implement and support an application programming interface (API) allowing for authorization requests to be issued from applications. For example, an "is authorized" (or "isAuthorized") API request can accept as input a four-tuple representing a request for authorization (equivalently an "authorization request"). The four-tuple may specify a principal, an action, a resource, and a request context. The request context contains contextual information about the authorization request and may be "transient" type data associated with the request itself, such as a network address associated with the client, a current date and/or timestamp, an indication of whether the user authenticated using multi-factor authentication (MFA) when signing in, or any other suitable request context information. In some examples, an "is authorized" request may further include a list of entities, which each could provide one or more attributes associated with a resource or principal for use in an authorization decision, such as an owner of a resource, a principal identifier, etc. Moreover, in some examples the authorization request may include user identity information, such as a token provided by an IdP. The authorization engine may process authorization requests and for each may return an authorization decision (e.g., a binary answer such as ALLOW or DENY) indicating whether the requested action (associated with the authorization request) is allowed or denied.

The authorization engine makes such decisions based on a set of one or more authorization policies that it can store in a data store (e.g., a database, object storage location, or the like). Thus, authorization policies describe who (the principal) is allowed to perform which actions, on which resources, and in what context. For example, a policy might state that only members of a "myFriends" group (the principals) can view and comment (the actions) on the photos in the "myVacation" album (the resources). Another example policy might state that the employees of a company (the principals) can read (the actions) only their own Human Resources records (the resources), and only during regular business hours (the context). Likewise, a policy for a medical application might state that only a doctor currently associated with a patient can create a referral to a different doctor.

Accordingly, an authorization engine can evaluate each authorization request against the policies associated with the application and the involved entities to make an allow or deny decision. The policies are thus separate and distinct from the application code. This design ensures permissions can be updated for an application without having to touch the application's code, possibly by a different set of users (e.g., a permissions or security team) than those who develop or maintain the application itself (e.g., software engineers). Thus, a change to a policy can result in an immediate change in the logic used to authorize requests. In some examples, policies can use attributes, which are key-value pairs that represent various aspects of the principal, the resource, and the caller's current session which defines the context of the request. Attributes can include information such as user roles, resource types, time of day, location, and other relevant contextual information. Thus, a user 102A and/or application (executed by a computing device) may interact with an authorization engine (or service) to define a set of one or more policies and/or configurations, which are stored in a data store of (or accessible to) the authorization engine or service. For example, the user 102A (e.g., a software engineer, security agent, etc., associated with an application 114) may write or create a set of policies in a policy language via a user interface provided by a console application (e.g., a web page or application screen) of the authorization engine or service. These policies can be used, by the authorization engine, to make authorization decisions responsive to authorization requests involving the application. Configuration data may also be provided, such as an indication of which IdPs are allowed to be used, an indication of particular resources or endpoints of an IdP that are to be used (e.g., an identifier of a specific identity provider service instance that is trusted to issue tokens), an indication of a discovery endpoint of the IdP (that can be used to obtain information about the IdP, its configuration, its public keys, and the like), a set of conflict or merge or mapping settings, etc.

Users of an application 114 (e.g., a user 102A, via use of their computing device 104A) may utilize the application 114 by first authenticating themselves, such as through use of an identity provider service 110A or 110B. These users may have been configured or registered with the identity provider service 110. For example, user 102A may belong to a user directory registered with the identity provider service 110. User directories 142 are for authentication via identity verification. With a user directory, users can sign into an application through the user directory or federate through a third-party IdP. User directories in some examples are a user directory with both self-service and administrator-driven user creation, management, and authentication. A user directory can be a standalone identity provider (IdP) or a service provider (SP) to a workforce or consumer IdP.

Via a user directory, the identity provider service 110 can issue authenticated tokens (e.g., JSON web tokens (JWTs)) to a user, an application, web server, API, etc. These tokens may adhere to a common protocol, such as OAuth 2.0 or OpenID Connect (OIDC).

Tokens can be used to grant access to resources to authenticated users. A token may have one or more claims, which provide information about the user. For example, an identity token (or "ID token") may contain claims about the user's identity, such as their username, family name, and email address. An access token, which can be used to authorize API operations, may include claims like scope that the authenticated user can use to access third-party APIs, for example. Such access and/or ID tokens may include a "groups" claim that includes the user's group membership in the user directory. These tokens may be signed by the identity provider service 110 to allow a recipient to verify the validity of the token, e.g., by fetching an associated public key 141 (e.g., a public key for access tokens, a public key for ID tokens) and determining if it can generate a hash/digest using that public key (and the token) that matches a corresponding hash/digest provided with the token. When a match is found, the recipient has thus validated that the token is legitimate and the claims in the token remain the same as what the identity provider service 110 believes they are.

In various examples, the PEZ 130 can provide one or two mechanisms to propagate user identity, e.g., to support combinations of OIDC-oriented applications and/or role-based applications. First, in some examples an application can request and propagate a time-bounded JSON Web Token (JWT) that is scoped for use between the requesting and target applications. This prevents replay of the token by other applications. Second, in some examples, if a user signs in to an application using an identity service 140, the application can request that the IAM service's secure token service 120 inject identity information for the user into an IAM role; if the application is authorized to do so, it can then pass the role to another application. An application that receives an IAM role with an injected user identity can extract the user identity to make authorization decisions based on the user or their group membership. It can also pass the role to other applications based upon the pass-role policies that the application has. It may also extract the user identity and request a JWT to access another PEZ-enabled application that supports the JWT method, or it can inject the extracted identity into another role.

In some examples, anytime a user identity is injected into a role, the requester must possess a verified token from the identity service 140 for the user; applications cannot simply request tokens for any user it might find in the identity service 140. This protection can guard against Confused Deputy exploitation through IAM roles by ensuring the user has signed in through the identity service 140, and any subsequent presentation of the user in roles or JWTs can be traced back to the user's original sign-in session.

As indicated herein, fine-grained resource authorization is supported via disclosed techniques. In some examples, applications can build fine-grained authorization mechanisms that use PEZ-propagated identities. The receiving application can extract the user information and do look-ups in the identity service 140 identity store to find the user attributes or group membership. An application may use its own policy models to control access based on the identity information, such as allow read access if the user is a member of a particular group (e.g., "GroupA"). Alternatively, an application can use the identity information to decide which role to use for additional work. For example, an application could have a mechanism to assign GroupA to a read-only role that the application uses. If the application receives a propagated identity and determines the user is part of the group, the application could then perform an "assume role" (to assume that role) for the read-only role. This enables applications to map user identities to IAM roles and use rich, fine-grained API request authentication protocol (e.g., AWS™ Signature Version 4, or "SigV4") mechanisms to manage permissions to cloud provider network resources.

In some examples, the PEZ techniques disclosed herein can deliver user identity context to applications, including when applications access other applications on behalf of a user. In some examples, the PEZ 130 delivers the user's identity and associated sign-in session back to the requestor. In some examples, though, the PEZ 130 can add security signals into the user session context that come from other security services or sources of information (e.g., from another security service or database of the cloud provider network). For example, applications could use the returned sign-in session to determine information such as the current user state, their device state, geolocation, multi-factor authentication state, and more. In some examples, this can be done through a pluggable broker interface to the identity service 140 session system that enables various zero-trust signal services to gather and report state information, continually or periodically, for the duration of a session. For example, a device management service can check device state as a user signs in. Later, an application uses the session it received from PEZ 130 to check the state of the device; it can then make a localized choice regarding whether the security score for user context and device state is sufficient to give access.

Accordingly, services and applications needing to interact with the PEZ 130 are updated to make calls to PEZ to pass and receive user identity, look up user attributes and group membership for authorization, and be adapted to understand how to make PEZ calls, specify OAuth scopes, etc.

In some examples, applications that request access to information in other applications must make a call to create a digital identity (e.g., token) that they pass to a specified application. In some examples, these applications can cache and reuse the token (e.g., for its specified lifetime), and may need to request a unique token for each application to which it makes requests.

In some examples, applications that receive tokens make a call to the PEZ 130 that verifies the token, and thereafter extract the user identity for use in subsequent operations (e.g., authorization decision-making).

Accordingly, users of the PEZ will beneficially be able to configure and audit resource access back to the specific user to meet compliance regulations and/or will no longer need to design and build highly complex mechanisms to enable analytics applications to make cross-account calls to other services while preserving the user's permissions to data, which can save customers hundreds of development months and costly ongoing management of bespoke solutions that are complex to deploy, administer, and train users for. Users, in some examples, will also benefit from the simplicity of having all user and group information, from their chosen identity source, in one place so PEZ-enabled applications can implement user and group-based authorization to resources.

In some examples, techniques disclosed herein provide full traceability of end-user actions across a call chain involving multiple services. In some examples, techniques disclosed herein provide the ability to use enterprise directory groups and user attributes to enforce fine-grained access control on a resource that is accessed transitively on behalf of a user. In some examples, techniques disclosed herein provide support for token orchestration across multiple IdPs for a single request (e.g., with external IdP assertion providers and the JWT-bearer grant).

In some examples, to begin use of the PEZ-based system, the user decides whether they want to implement PEZ services in multiple accounts across an organization (registered with the cloud provider network), or if they want to implement PEZ services in a single stand-alone account or a member account. For a multi-account PEZ deployment, the user may enable use of the identity service 140 in their organizational management account; for single account deployments, they may deploy a PEZ-enabled or other identity service 140 enabled application in the target account and select an option to create an identity service 140 instance in the account.

After enabling the identity service 140, an identity service 140 administrator can add the applications and services that are "approved" (trusted) to use PEZ via an interface of identity service 140. Users who sign into PEZ-enabled applications may first be assigned access to all application and services involved in request flows that an application initiates, or the service may be configured to "allow all users." If a user is disallowed to any service in the request flow, the PEZ 130 will not generate a token for the initiating application to use with the receiving service, and the user will be blocked from accessing the receiving service.

For example, imagine a case where a user seeks to use an ML service 132 that itself uses a DWS 126. Suppose the ML service 132 administrator assigned a subset of identity service 140 users to access to the front-door of ML service 132, and DWS 126 was registered with an "allow all users." Users who are authorized to use ML service 132 can then use ML service 132 to access data in DWS 126, and DWS 126 uses its own permissions model to scope the user's access to data. However, if identity service 140 permissions to DWS 126 allowed only a subset of the assigned ML service 132 users, identity service 140 will block ML service 132 users who are not assigned to DWS 126 when ML service 132 attempts to obtain a PEZ token to DWS 126 for those users.

In some examples, registration involves adding the application, specifying a token verifier for the application, specifying which IAM role the service uses to make PEZ calls (as an "actor"), and specifying the services for which the registered application or service can request tokens. The call to PEZ 130 may then be performed using the actor role. Providing the application is registered correctly, PEZ 130 verifies that the request to obtain a token for the specified service is allowed and returns a token that can be passed to the receiving service.

In some cases, users may utilize an application 114 that uses a database driver interface. In such cases, with the latest JDBC/ODBC drivers, the user may have options to prepopulate the user credentials or driver can open a browser pop-up for user credentials. This application may utilize identities that have the same username as those that are configured in the IdP. Next, the user may register their IdP as the identity source to identity service 140. The user may then configure identity service 140 to authorize the associated cloud services and any other interconnected PEZ-enabled services to use PEZ. The service/application administrator may then configure their database roles for the users and groups (from the other IdP) and assign necessary permissions. Finally, the user may connect their JDBC/ODBC based application to the cloud service/application through a JDBC/ODBC driver interface.

For managing access to PEZ service resources, each PEZ service manages permissions to its own resources and enforces them consistently based on the user presented in the PEZ token. Each PEZ service has an identity-aware permissions model it creates and administers, such as "GROUPA has READONLY permissions to TABLEX," which indicates a user or group of users (e.g., "GROUPA"), a type of access that is permitted (e.g., "READONLY"), and a particular associated resource (e.g., "TABLEX"). The user may use the service's APIs or administrative console to create these permissions. Thus, the PEZ services can use identity service 140 identity store APIs to look up and present users or groups and assign users and groups to resources. Applications that request access to a resource service do not need to know or understand what permissions the user has to the resource service; the permissions can be enforced by the resource service when the application makes its request.

It is to be appreciated that these identity passing techniques can be implemented in a variety of ways for a variety of use cases, a few of which are outlined in turn.

For example, one use case involves a PEZ-enabled application that can request a token for another PEZ-enabled service. The token contains the information necessary for downstream services to authorize access based on the user. For example, an ML service user can make requests through any workflows involving any combination of a big data platform service, data warehouse service, or data lake service, etc. The ML service can pass a token that can be used with a downstream service specified by ML service. The downstream services can then use the token to constrain access to the user's permissions.

Another use case is for a user making a request through a JDBC-based application to a cloud provider network data service, such as DWS 126. For example, a user who uses a third-party IdP and a third party (e.g., analytics) application can federate the IdP to the cloud identity service 140. The cloud provider network data service administrator can thus use identity service 140 to assign the IdP users access to data service data (e.g., tables). Accordingly, when the third-party application users access the data service via JDBC drivers, the data service can identify the user in the JDBC request and request a token from PEZ. The token provides the information the data service needs to enforce access based on the user's permissions.

A third use case is for a PEZ-enabled application or service to make a request of a third-party application or service. The PEZ-enabled application can make a PEZ call to obtain a token that is suitable for use with the third-party application. The PEZ-enabled application then passes the token to the external service as part of its request flow. The external service can introspect the token to enforce permissions based on the user's identity.

A fourth use case is for a third-party to integrate with PEZ, in the same way as cloud PEZ-enabled applications do, to make PEZ calls to obtain tokens for other PEZ-enabled services, and then make calls to those PEZ enabled services.

As described, the end-user experience when using a PEZ-enabled application is straightforward. For example, a user may go to a first service's user interface (e.g., web-based console, standalone application, or the like). This user will see, via the UI, that they have access to resources of a second service (e.g., big data clusters provided by a big data/analytics service); these permissions may have been earlier granted by the administrator who manages use of the first service for the user. The user may then select a link to the second service and navigate to a request screen of the second service. The second service will have received a token from the first service that identified the user. Because the second service has entitlements for the user, the second service grants the user access to the second service's data/resources. Beneficially, the first service's administrator did not need to know about the second service's permissions for the user, and the end user did not need to copy and paste any resource identifiers or assume any specific IAM roles. Instead, the second service remained in full control of what the user could access, via the first service, based on the security policies that the second service's administrator established for the user.

Modern cloud provider networks do not provide full support of identities in various workflows, such as allowing end-users to log into their applications (e.g., data warehouse clusters) using third-party credentials (e.g., Microsoft™ Active Directory™ (AD) credentials), to granting column/row access rights in data lakes to users or groups based on their IdP group membership, to granting read-write or read-only (RW/RO) access to object storage service data sets to their AD (or/LDAP, external IdP, etc.) users and groups, to sending logging data into activity monitoring services in a way that straightforwardly indicates which employee accessed a particular set of data, etc.

In many Data/ML/Analytics organizational use cases, it is common for a studio/notebook/workbench type application (e.g., AWS Sagemaker Studio™) to make downstream requests to other systems for data, a chain that involves calling downstream SigV4-authenticated cloud services, sometimes involves non-SigV4 authenticated cloud service interfaces (e.g., JDBC connections); might pass through customer-controlled compute (e.g., AWS EMR™ clusters) or third-party applications; and culminate in a request for raw data (e.g., an object storage service API call, query on a data warehouse table, etc.). Using techniques disclosed herein, a cloud provider is able to preserve the identity of the user, and their permissions, everywhere along this call chain, all the way to an activity monitoring service (e.g., AWS CloudTrail™) audit log.

While some cloud identity services support user authentication for "entry-point" web applications, these services do not allow the application to transitively pass that context to downstream services. As disclosed herein, an identity service 140 is configured with a "PEZ" capability to enable identity passing via standards-based and publicly consumable models that cloud managed, third-party, and/or customer-managed services can integrate with.

Use of these PEZ systems and techniques can solve a variety of problems for customers. For example, a user's identity can stay with their request in a secure and verifiable way, even when the request transitions among multiple different compute environments—whether cloud controlled or not—and can end with resultant log data being written to an activity monitoring service 122. As another example, embodiments provide an accompanying set of directory APIs that any integrating service can use to fetch any/all user attributes and their enterprise group memberships. In some examples, these capabilities are publicly accessible and are standards compliant with OAuth specifications, to support use-cases across cloud services, customer-managed services and third-party SaaS applications.

The identity service 140 (e.g., AWS™ IAM Identity Center™) is used by customers leverage to connect their enterprise IdP to their cloud environment, to administer access to their cloud accounts and applications. To enable the use-cases for PEZ, the identity service 140 is further adapted to orchestrate token exchanges to enable applications to pass authenticated end-user context to downstream services. In some examples, this is done by adding support for OAuth Token Exchange grants in the identity service 140, modeled to be spec-compliant with the OAuth Token Exchange specification (RFC 8693).

Exchanging an External IdP Token at the Cloud Perimeter

In some examples, customers can exchange an external IdP token at the cloud perimeter. For example, customers with applications that federate via their IdP of choice are able to, using techniques disclosed herein, present authenticated end-user context to a cloud service that is able to authenticate the end-user, look-up their attributes and group memberships, as part of authorizing access to resources. As another example, for customers that use a cloud service as a data source with a separate third-party application, that application may issue a signed JWT token to establish a connection to the cloud service (e.g., for executing queries (via JDBC)). The cloud service can thus authenticate the end-user, look-up their attributes and group memberships to authorize access and set up a long-lived connection for the user for query execution.

Thus, in some examples, the identity service 140 supports exchanging an external IdP issued JWT token for an identity service 140-issued token for the same audience. This allows an application that is authenticating users via an IdP different from the identity service 140 instance to participate in identity passing to forward on-behalf-of context to other applications. For the token to be successfully issued, the presented token will be validated against a pre-registered external token verifier (audience, issuer, signature).

Identity Passing Via OAuth Access Tokens

In some examples disclosed herein, identity passing can occur via the use of OAuth Access Tokens. For example, cloud services (e.g., data warehouse services, big data processing services, etc.) that are database services may host endpoints for database connection/query execution that aren't SigV4 based. This class of services that need to be passed identity context fall under this category. As another example, scenarios that involve identity passing to customer-managed OAuth resource servers (self-managed or third-party applications) may also fall under this category. Thus, in some examples, for applications that need to pass on-behalf-of user context to a downstream application, the identity service 140 can support exchanging an OAuth access token for an access token for the downstream audience. The OAuth access token holds both the caller context (e.g., the "azp" claim) and the on-behalf-of user's context (e.g., the "sub" claim), for the downstream service to authorize the end-user and the calling application accordingly per their needs.

Identity Passing Via SigV4 Credentials

In some examples, downstream cloud services can integrate with PEZ to be passed identities. One such use-case is the ability for a downstream service such as a data lake management service (e.g., AWS Lake Formation™) to receive on-behalf-of end-user context from other "upstream" services such as a data warehouse service, ML service, big data service, analytics service, etc., that it can use to perform fine-grained access control checks based on the end-user and their group memberships.

Accordingly, this capability can be leveraged by customers of the cloud provider within their applications to call cloud services and pass on-behalf-of user context—for instance, a customer-owned data processing application that needs to enforce fine-grained access control for data stored in an object storage service may use this technique to pass on-behalf-of user context.

Examples disclosed herein are also useful in scenarios where the downstream service is not identity service 140 aware. For example, consider an object or file storage service that may be the tail-end of a call chain for many analytics-type workloads. For such uses, customers may want the object or file storage service's audit logs (in an activity monitoring service 122) to communicate the on-behalf-of user that triggered the call, in addition to the immediate service/role that performed the request.

In some examples, an application (e.g., customer or cloud managed) can retrieve signed/encrypted context from the identity service 140 that conveys on-behalf-of user metadata (e.g., as a claim in the token—sts:identity_context) that can be passed on (e.g., to a secure token service (STS)) as a parameter for an assumeRole operation. This information is injected into the issued session credential as context keys—e.g., one context key to convey the userId for the on-behalf-of user, and a second context key to persist the backing IdC session_id for the OAuth session, so the call chain can be retraced.

In some examples, the service that receives a SigV4 credential can exchange it for an OAuth token that presents the caller context (e.g., what IdC application invoked the API) and the subject context (e.g., the on-behalf-of end user), that can be used by the application for fine-grained access control (FGAC) based authorization, logging, etc.

Using the Token Context to Fetch User/Group Data for FGAC

In some examples, a cloud service can receive an end-user's context and query group memberships to enforce fine-grained access control on customer resources.

For example, the identity service 140 hosts APIs for user, group, and group membership operations. The "subject" in the identity service 140 issued token can refer to the authenticated user's userId—the identity service 140 issued globally unique identifier (GUID) associated with the user. In some examples, any caller with the right IAM permissions—service principal or IAM role—can call the identity service's public APIs.

In some examples, these techniques work irrespective of the user's choice of identity provider, whether it be an on-premise AD instance, a third-party provider, a home-grown custom SAML IdP, or the identity service 140 itself as their IdP), because users/groups can be synchronized into the identity service 140 identity store.

Activity Monitoring Service Logging for the End-User Context

In some examples, services that support a SigV4 interface and ingest on-behalf-of user context via SigV4 credentials, can update their activity monitoring service handler, which will automatically extract the on-behalf-of user context and emit it to the customer's activity monitoring service event records. For example, an object storage service's data plane events may include this context when the upstream service is a PEZ-integrated service, such as a data lake management service.

In some examples, via use of the PEZ techniques and systems disclosed herein, activity monitoring service logs across services will contain on-behalf-of user context in a format that can be easily mapped to a customer's IdP identity context. For example, the "onBehalfOfUser" can be stored in the "userIdentity" struct, in addition to existing information published to event records by cloud services.

Figure 2:
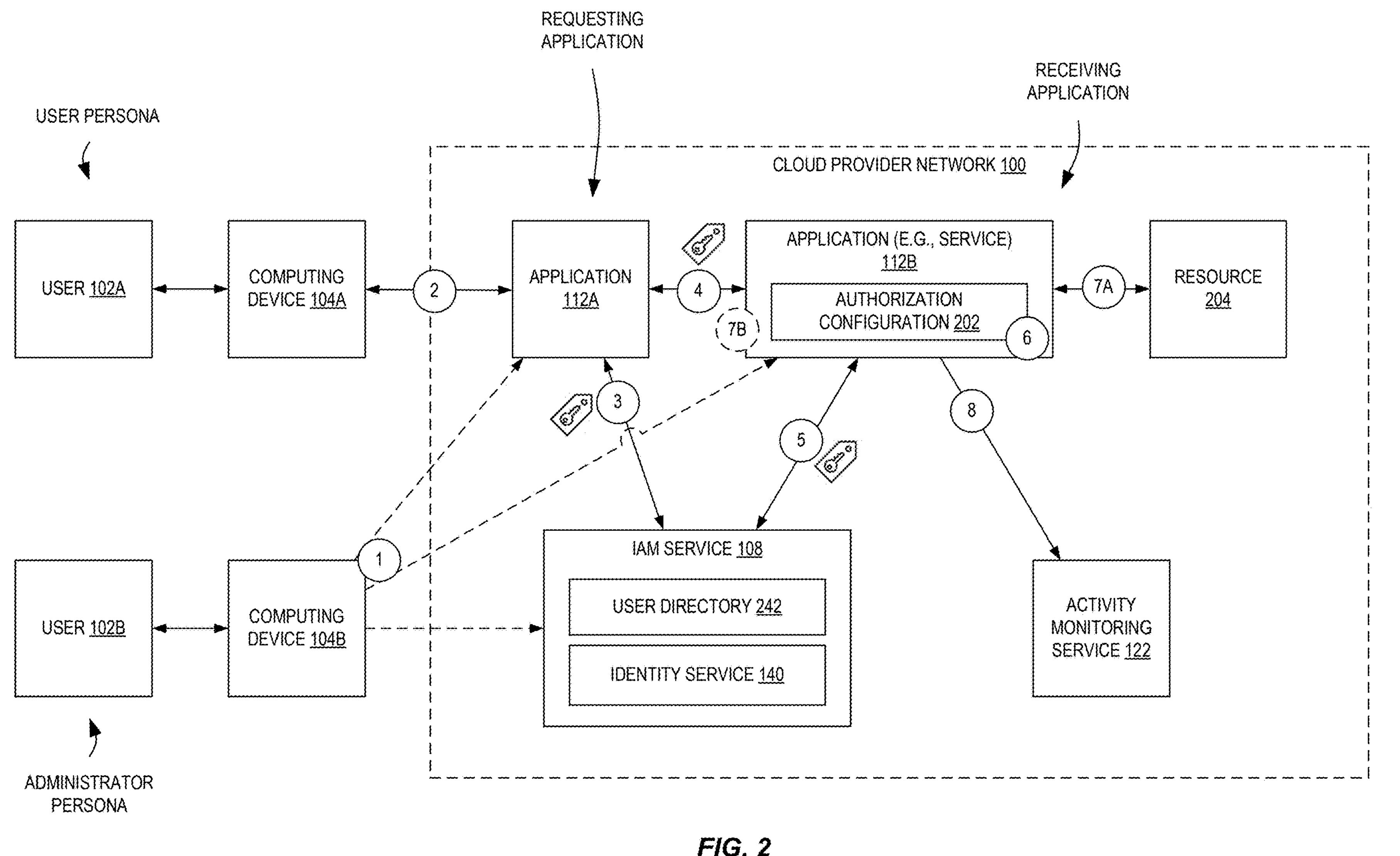
FIG. 2 is a diagram illustrating a system providing auditable transitive user identity propagation with an in-cloud requesting application according to some examples.

For a more specific example, we turn to FIG. 2, which is a diagram illustrating a system providing auditable transitive user identity propagation with an in-cloud requesting application according to some examples. Trusted identity propagation can provide a streamlined single sign-on experience for users of various types of applications, such as query tools and business intelligence (BI) applications, who require access to data in (or managed by) cloud provider network services. Data access management may thus be based on a user's identity, so administrators can grant access based on users' existing user and group memberships. User access to cloud provider network services and other events can be recorded in service-specific logs and in events stored by monitoring services, so that auditors can determine what actions the users took and which resources the users accessed.

Trusted identity propagation, in some examples, is built on the OAuth 2.0 Authorization Framework, which allows applications to access and share user data securely without sharing passwords. OAuth 2.0 provides secure delegated access to application resources. Access is deemed "delegated" because the resource administrator approves (or delegates) the application that the user signs in to, to access the other application. Thus, with trusted identity propagation, a user can sign in to an application, and that application can pass the users' identity in requests to access data in other applications (e.g., services). Because access is managed based on a user's identity, users do not need to have local user credentials (for each involved application in a chain) or assume an IAM role to access data.

Generally, the OAuth (or "Open Authorization") protocol provides a way for resource owners to provide a client application with secure delegated access to server resources. OAuth provides a process for resource owners to be able to authorize third-party access to their server resources without providing credentials. Using the widely utilized Hypertext Transfer Protocol (HTTP), OAuth allows access tokens to be issued to third-party clients by an authorization server, with the approval of the resource owner. The third party may then use the access token to access protected resources hosted by the resource server.

Accordingly, in some examples to avoid sharing user passwords, trusted identity propagation utilizes tokens. Tokens provide a standard way for a trusted application to claim who the user is and what requests are permitted between two applications. Cloud-managed applications that are configured to utilize trusted identity propagation can obtain tokens from an identity service 140 directly.

As shown in the example of FIG. 2, a user 102B (e.g., an administrator persona of an organization) may use a computing device 104B to configure the application 112A for trusted identity propagation as reflected by circle (1). This may be performed via a web-based interface (e.g., a "console" application), a special-purpose application, the use of a command-line interface, or the like, resulting in requests being transmitted from the user's 102B computing device 104B to the provider network 100.

This configuration process can include, for example, the user 102B instructing the application 112A to "connect" (or register) to the appropriate instance of the identity service 140 for use in obtaining tokens. In some examples, an organization or subset thereof, or even just a user 102B, may have an "instance" of an identity service 140 deployed for their use. Thus, this configuration can include the user providing an identifier of the instance to the application (e.g., an instance identifier, an identifier of an endpoint associated with the instance such as a hostname or network address, etc.) and/or configuration needed to connect to the instance, such as a secret key or passphrase, an application/protocol configuration, or the like. This may also, in some examples, involve the user 102B interacting with the IAM service(s) 108 (e.g., identity service 140) as part of this process, such as to create a new instance of the identity service 140, obtain information about an instance (e.g., the instance identifier), register the requesting and/or receiving applications as enabled to access the instance and/or perform identity propagation, or the like.

The configuration also includes, in some examples, configuring permissions to authorize which application resources a particular user (or group) can access. For example, the user 102B may configure a receiving application 112B to allow a particular user or group the ability to read from a particular set of resources (e.g., read a file, read files from a storage location, access data from a table), create or update or write data to a particular set of resources (e.g., write one or more files, update a database table with new data), or the like. For example, this may be stored by a receiving application 112B as authorization configuration 202, which may include a data structure reflective of an association between a user or group identifier with those resources and particular permissions that the user or group has with regard to those resources.

Thereafter, in some examples the OAuth 2.0 process is initiated when a user signs in to an application, e.g., application 112A. This application 112A may be of a variety of types and be implemented in a variety of locations in various embodiments; in this example, the application 112A may be provided by a service 112 of the cloud provider network 100 such as a data warehouse service 126, analytics service, business intelligence service, or other type of service. This application 112A that the user signs in to, as reflected by circle (2), thereafter initiates a request to access one or more resources provided by another application, e.g., application 112B. The access may be to a variety of types of resources 204, such as a database or set of one or more files, or to access a functional resource such as a function performed by the application 112B, or the like. The initiating (or "requesting") application 112A can access the "receiving" application 112B on behalf of the user by requesting a token from an authorization server (e.g., an IAM service 108, such as identity service 140) as reflected by circle (3). This authorization server returns the token, also at circle (3), and thereafter the initiating application passes that token as part of (or with) a request for access, to the receiving application at circle (4).

Thus, in some examples, trusted identity propagation flows involving cloud provider network managed applications begin with an application 112A that obtains a token from an IAM service 108. This token is utilized because it contains a reference to a user that is known to the identity service 140 (e.g., via a user directory 242) and applications that are registered with the identity service 140.

A requesting application 112A can obtain a token from the identity service 140 to initiate trusted identity propagation in a variety of ways.

For example, this process may involve a web-based IAM service 108 authentication of the user 102A. For this flow, the cloud-managed application 112A provides a web-based single sign-on (SSO) experience using the identity service 140 for authentication. When a user opens a cloud-managed application 112A, a single sign-on flow that uses the identity service 140 is triggered. If there isn't an active session for the user tracked in identity service 140, the user can be presented with a sign-in page based on the identity source that was configured for the user, and the identity service 140 creates a session for the user.

The identity service 140 may thus provide the cloud-managed application 112A with a token that includes the user's identity and a list of audiences ("Auds") and related scopes that the application 112A is registered to use.

An access "scope" defines the boundaries of access permissions for a specific application or resource. It helps control who can interact with that application or resource. Thus, an access scope can essentially be viewed as a named set of permissions or privileges specifying what actions or operations a user or application or group is allowed to perform within a certain context. The access scope may also identify (or be associated with) authorized targets, which are the identifiers of entities that are allowed to access the resources associated with a particular access scope. These targets could be applications, services, users, or other entities that need access to specific functionality. When a user defines an access scope, they specify which targets are authorized to use it. For example, a user can create an access scope for a specific application that defines the permissions that users or groups have when accessing that application. In this case, the authorized targets would be the specific users or groups who are allowed to use that access scope to interact with the application.

Thus, the application can thereafter use the token to make requests to other receiving services/applications (e.g., application 112B, and potentially others).

Another option for a requesting application 112A to obtain a token from the identity service 140 may include a "console-based" approach. For this flow, the cloud-managed application 112A provides a console experience that users initiate, e.g., via a web browser. In this case, the cloud-managed application may be entered from a cloud provider network "management console" after assuming a role. For application 112A to obtain a token, the user may initiate a process to trigger the application to authenticate the user. This initiates authentication using identity service 140, which will redirect the user to the identity source that has been configured for use.

After a requesting application 112A obtains a token from the identity service 140 (at circle (3)), the application 112A may periodically refresh the token, which can be used for the life of the user's session. During this time, the application may (a) obtain more information about the token to determine who the user is and which scopes the application can use with other receiving cloud-managed applications, (b) pass the token in calls to other receiving cloud-managed applications that support the use of tokens (such as at circle (4)), and/or (c) obtain identity-enhanced IAM role sessions that it can use to make requests to other cloud-managed applications that use a different API request authentication protocol (e.g., SigV4). An identity-enhanced IAM role session is an IAM role session that contains the user's propagated identity stored in a token that is created by the identity service 140.

Returning to FIG. 2, with reference to circle (3), to obtain a token to access the receiving cloud-managed application 112B, the requesting cloud-managed application 112A can initiate a sign-in request to the identity service 140. If the user isn't already signed in, identity service 140 can trigger a user authentication flow to the identity source that has been specified. This may create a new cloud access portal session for the user with the duration that was pre-configured in the identity service 140 (e.g., by user 102B). The identity service 140 then generates a token that is associated with the session, and the application can operate for the remaining duration of the user's access portal session. If the user signs out of their application, or if their session is deleted (e.g., by user 102B), the system may be configured such that the session will automatically end within two hours.

At circle (4), the cloud-managed application 112A initiates a request to the receiving application 112B to access a resource and provides its token. At circle (5), the receiving application 112B makes calls to the identity service 140 to obtain the identity of the user and the scopes that are encoded in the token. For example, the token may be encrypted by the identity service 140, and the identity service 140 may then decrypt it (or verify its authenticity) and provide back the requested data, which may have been carried in the token in a form inaccessible to the application 112B. The receiving application 112B may also make requests to obtain user attributes and/or the user's group memberships from the identity service 140 accessible user directory 242.

With any or all of this information, at circle (6) the receiving application 112B uses its authorization configuration 202 to determine if the user is authorized to access the requested application resource 204. For example, the authorization configuration 202 may indicate that a particular user or group can make a particular type of access to a particular resource. If the user's identity (from the token) and/or group identity (again, from the token), combined with the requested type of resource access, satisfies a configured criteria in the authorization configuration 202, the access can be allowed. Thus, if the user is authorized to access the requested application resource, the receiving application 112B responds to the request, which may include operating (or obtaining) the resource 204 at circle (7A), optionally returning a response at circle (7B) that details a result of the access and/or includes the resource (or data based on the resource), etc. Otherwise, if the user is not authorized, the receiving application 112B may deny the request, sending back a response message to the requesting application 112A indicating as such.

As part of this process, in some examples the user's identity, actions performed on their behalf, and other events can be recorded in the receiving application 112B logs and/or provided to an activity monitoring service 112 in the form of logs or events at circle (8). Beneficially, the specific way in which this information is logged can flexibly vary based on the application; however, the fact that the user's identity (and/or group's identity corresponding to the user) can be recorded in association with this access, allowing further auditing, monitoring, or the like, despite the fact that the user is multiple "steps" away in the chain of access—i.e., it was the application 112A that initiated the access.

Identity service 140 can also provide an option for applications to exchange identity tokens and access tokens that come from an external authorization server. This makes it possible for an application to authenticate and obtain tokens outside of the cloud provider network 100, exchange the token for an identity service 140 token, and use the new token to make requests to cloud services/applications. For example, FIG. 3 is a diagram illustrating a system providing auditable transitive user identity propagation with a third-party managed requesting application according to some examples.

Trusted identity propagation in some examples enables a third-party application (e.g., a customer-managed application) to request access to data or resources in cloud provider network services on behalf of a user. Data access management can be performed based on a user's identity, so administrators can grant access based on users' existing user and group memberships. The user's identity, actions performed on their behalf, and other events may likewise be recorded in service-specific logs and monitoring service logs/events, allowing for auditing, reporting, and management. With trusted identity propagation, a user can thus sign in to a customer-managed application, and that application can pass the user's identity in requests to access data in cloud services.

Figure 3:
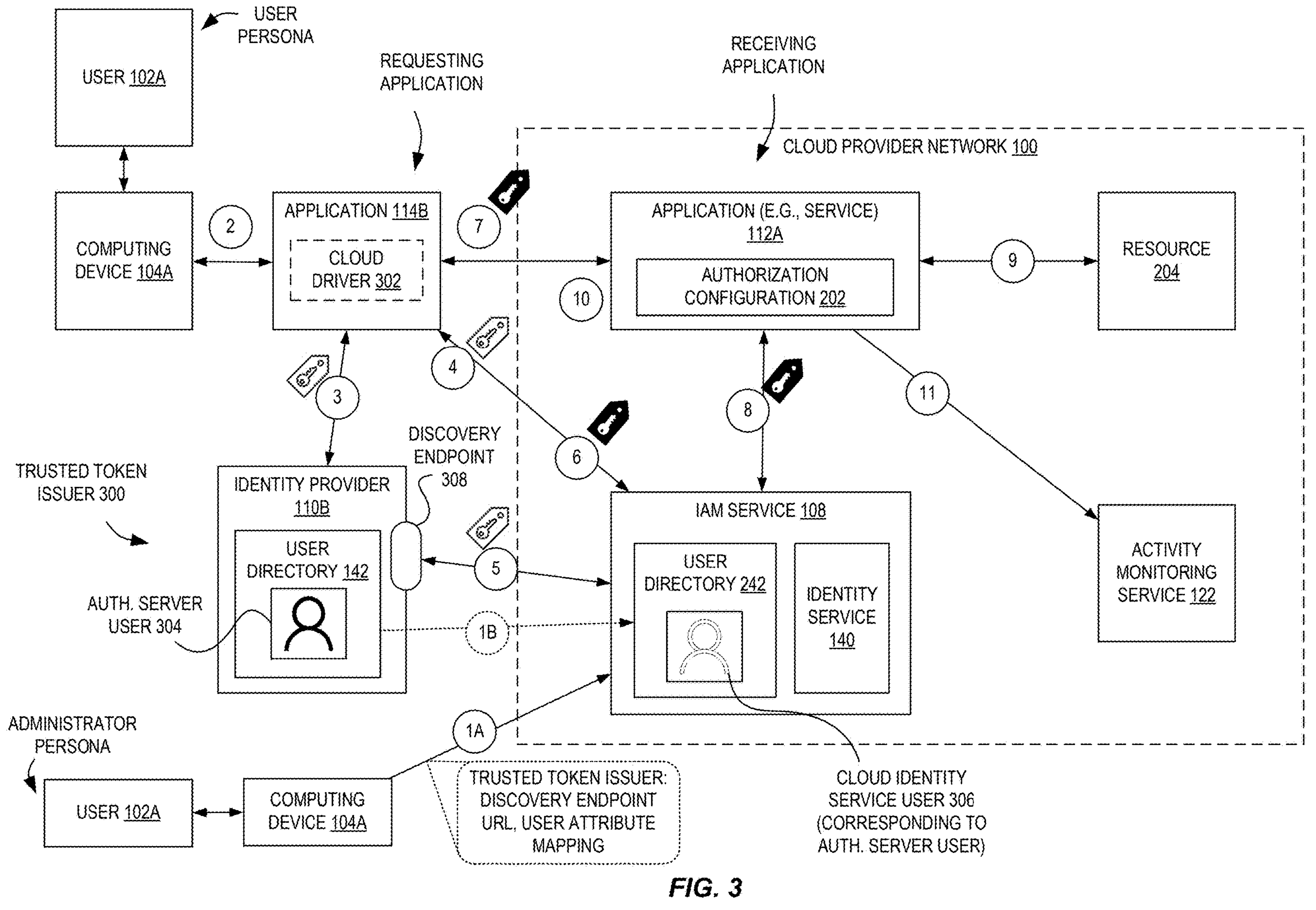
FIG. 3 is a diagram illustrating a system providing auditable transitive user identity propagation with a third-party managed requesting application according to some examples.

Accordingly, at circle (1A) in FIG. 3, a user 102A (e.g., an administrator persona) may interact with the IAM service (s) 108 (e.g., the identity service 140) to configure the identity service 140 to support trusted identity propagation. This can include "adding" (or registering) a customer-managed application with the identity service 140, providing configuration details involving the application and the trusted token issuer 300 it will use.

For example, the user 102A may provide configuration data in the form of an application name, an application description, whether all registered users (e.g., in the user directory 242) may access the application or a defined set of those users may access the application, etc. The user 102A may also provide an identifier associated with the application such as a URL where users access the application, and the like.

The user 102A may also provide configuration data to specify a trusted token issuer (or "TTI") for the application. If a TTI has already been registered with the identity service 140, the user may select (or identify) one. Otherwise, the user 102A may register one by providing data such as an identifier for the TTI (e.g., an "Issuer URL" that is an OIDS discovery URL of the external IdP that will issue tokens for trusted identity propagation), a TTI name, and/or a configuration for attribute mapping.

In some examples, a user may provide information to "map" a user (e.g., authentication server user 304) from the TTI's user directory 142 to a cloud identity service user 306 from the IAM service(s) 108 user directory 242. For example, the user 102A may indicate that a value from a particular field (or attribute) in tokens issued by the identity provider 110B are to be used to identify users from a particular field/attribute the user directory 242—e.g., use an "email_address" field in a token from the identity provider 110B to find a user record in the user directory 242, where email addresses are stored in an "email" field. With this mapping information, the identity service 140 is thus able to "translate" the identity of the user from the external IdP 110B to the identity of the user within the cloud provider network domain of the user directory 242.

In some examples, the user 102A may create cloud user directory 242 users, groups, etc., in a manual basis, obtain this data from a separate system, or even configure the identity provider 110B to "mirror" some or all user directory 142 data, as reflected by circle (1B), into the user directory 242 of the IAM service(s) 108.

The user 102A may further configure their selected TTI, with the identity service 140, by providing an audience claim ("Aud" claim) value indicating the intended audience (or recipients) for issued tokens to be generated by the TTI, etc.

Moreover, in some examples, the user 102A may specify application credentials that the third-party application uses to perform token exchange actions with trusted applications. These credentials can be used in a resource-based policy that requires that the user specify a principal (e.g., a user account) that has permissions to perform the actions that are specified in the policy.

Further, in some examples, the user 102A may then specify a set of trusted applications. After setting up the customer-managed application, the user may specify one or more trusted cloud provider work services (or trusted applications) for identity propagation, such as those that have data or resources that users of the customer-managed applications need to access. Thus, when those users sign in to the customer-managed application, that application will pass those users' identities to the trusted application. This configuration may include selecting individual applications from a list, defining specific access levels per application, etc.

Thus, with applications and TTIs configured, trusted identity propagation can be performed. Accordingly, the identity service 140 provides a way for a requesting application 114B (or a cloud driver 302 program or plugin provided by the cloud provider network 100) to exchange the token issued by the trusted token issuer 300 (here, identity provider 110B) for a token that is generated by the identity service 140 that refers to the corresponding identity service 140 user 306 (from user directory 242). The requesting application 114B (or driver 302) may then use the new token to initiate a request to the receiving application 112A. Because the new token references the corresponding user 306 in the user directory 242, the receiving application 112A can easily authorize the requested access based on the user or their group membership as represented in the IAM service(s) 108 along with its authorization configuration 202.

Thereafter, in the example of FIG. 3, the request flow begins when a user 102A (e.g., an end user such as an employee of an organization) opens or connects to the requesting application 114B at circle (2). The requesting application 114B requests a token from the trusted token issuer 300 (here, identity provider 110B) at circle (3) to initiate requests to the receiving cloud-managed application 112A. If the user hasn't authenticated yet, this process may trigger an authentication flow. The token contains the following information: the subject (Sub) of the user, the attribute that identity service 140 will use'to look up the corresponding user in the user directory 242, an audience claim that contains a value that the trusted token issuer associates with the receiving cloud-managed application 112A. This token is generated and provided back to application 114B.

The requesting application 114B, or the cloud driver 302 that it uses, passes the external IdP token (represented visually in white) to identity service 140 at circle (4) and requests that the token be exchanged for a token (represented visually in black) that is to be generated by identity service 140 (e.g., the PEZ component 130).

The identity service 140 then, at circle (5), uses the configured OIDC Discovery endpoint 308 to obtain the public key that it can use to verify the authenticity of the token. The identity service 140 may then verify the authenticity of the token (e.g., based on computing and/or testing hashes using the obtained key, or another technique known to those of skill in the art), and search the user directory 242 to identify the corresponding cloud identity service user 306 record. To do this, the identity service 140 uses the mapped attribute specified in the token to perform a lookup into the user directory 242. The identity service 140 may then verify that the user is authorized to access the receiving application. If the cloud-managed application 112A is configured to require assignments to users and groups, the user must have a direct or group-based assignment to the application; otherwise the request is denied. If the cloud-managed application 112A is configured to not require user and group assignments, processing continues. The identity service 140 may also verify that the requesting application 114B is configured to use valid scopes for the receiving cloud-managed application 112A.

If the previous verification steps are successful, the identity service 140 creates a new token as represented in the figure in black. The new token can be an opaque (or, encrypted) token that includes the identity of the corresponding user in the user directory 242, the audience (Aud) of the receiving cloud-managed application 112A, and the scopes that the requesting application 114B can use when making requests to the receiving cloud-managed application 112A. This token is returned to the requesting application 114B, as reflected by circle (6).

At circle (7), the requesting application 114B, or the driver 302 that it uses, initiates a resource request to the receiving application 112A and passes the token that the identity service 140 generated to the receiving application 112A.

The receiving application 112A, at circle (8), can make one or more calls (requests), passing the token, to the identity service 140 to obtain the identity of the user and the scopes that are encoded in the token. The receiving application 112A, in some examples, may also make requests to the identity service 140 to obtain user attributes or the user's group memberships from the user directory 242.

The receiving application 112A may then use its authorization configuration 202 to determine if the user is authorized to access the requested application resource 204. If not, the request may be denied, and a response sent back to the requesting application 114B from the receiving application 112A indicating such. If so, the receiving application 112A may provide the access (e.g., create an object, read an object, update an object, delete an object, or many other types of actions) at circle (9) to the resource 204. A response can be provided back at circle (10), e.g., indicating the successful access to the resource, containing the resource, or the like. At circle (11), the user's identity, actions performed on their behalf, and other events can be recorded in the receiving application 112A logs and/or stored to an activity monitoring service 122 as logs or events. The specific way in which this information is logged can vary based on the application.

As shown in FIG. 3, a user can sign in to a third-party application 114B via use of an identity provider 110B that are external to a cloud provider network 100, and that application 114B can pass the user's identity in requests to access data or resources provided by cloud services. However, this same configuration can be utilized in different scenarios, such as where the identity provider 110B is actually a part of a cloud provider network 100, and the data or resources sought to be accessed may be elsewhere, such as part of a third-party system. In such examples, the requesting application 114B may also be a part of the cloud provider network 100 or even external to the cloud provider network 100, though utilize an identity provider 110B of the cloud provider (e.g., as part of an IAM service 108 offering).

Figure 4:
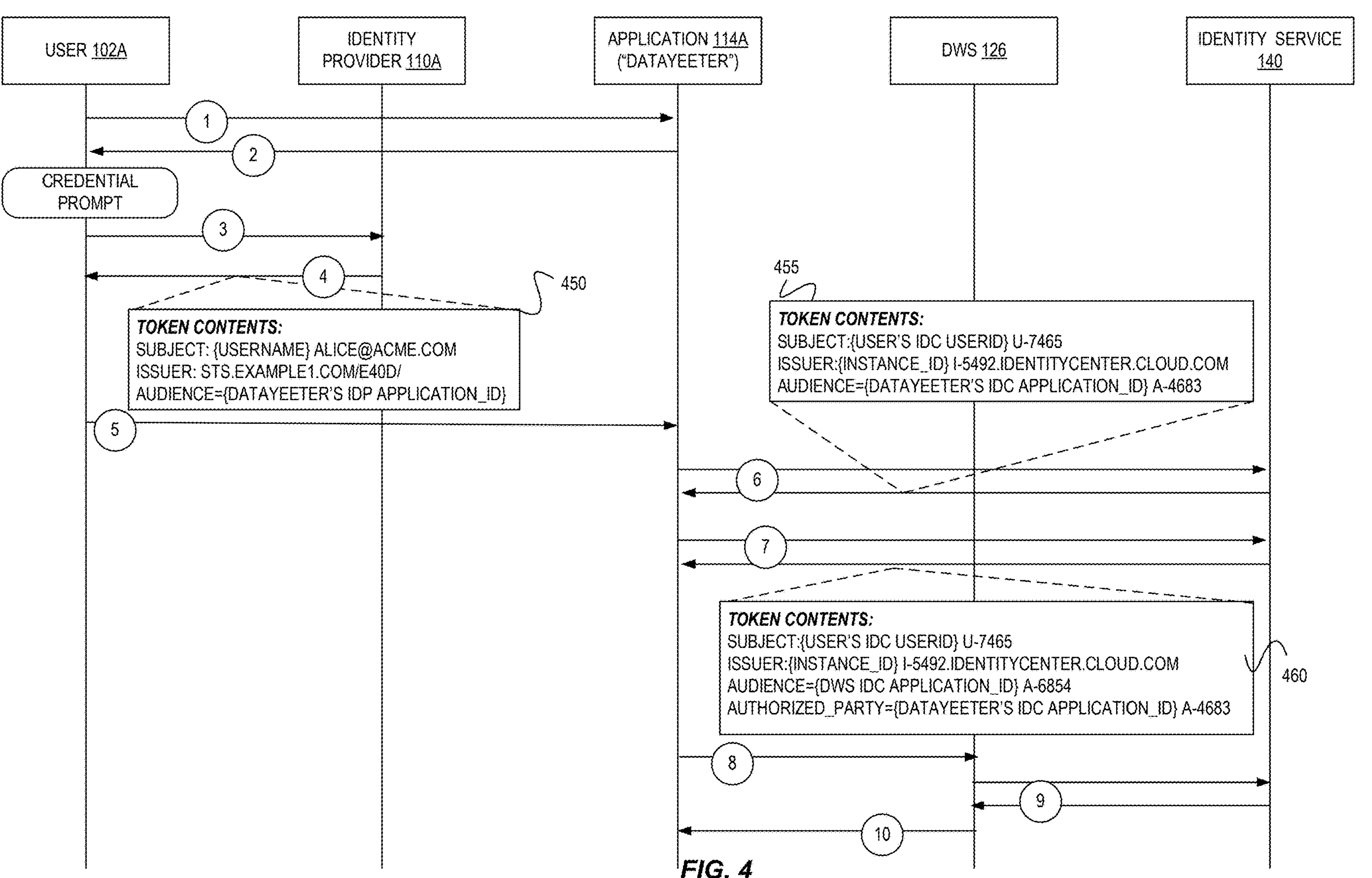
FIG. 4 is a diagram illustrating a connection establishment phase of use of a token exchange system for auditable identity propagation according to some examples.
Figure 5:
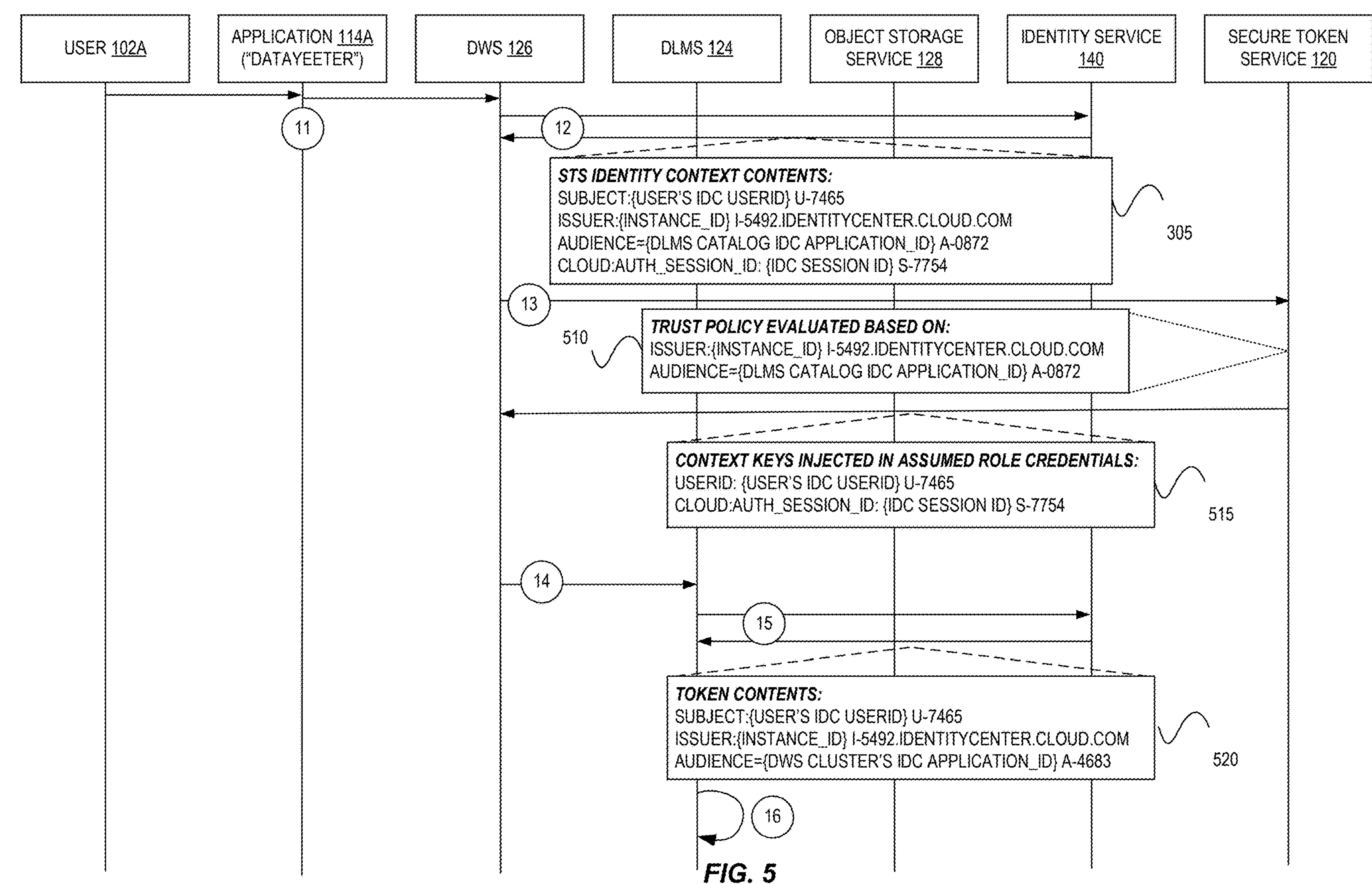
FIG. 5 is a diagram illustrating a grant establishment phase of use of a token exchange system for auditable identity propagation according to some examples.
Figure 6:
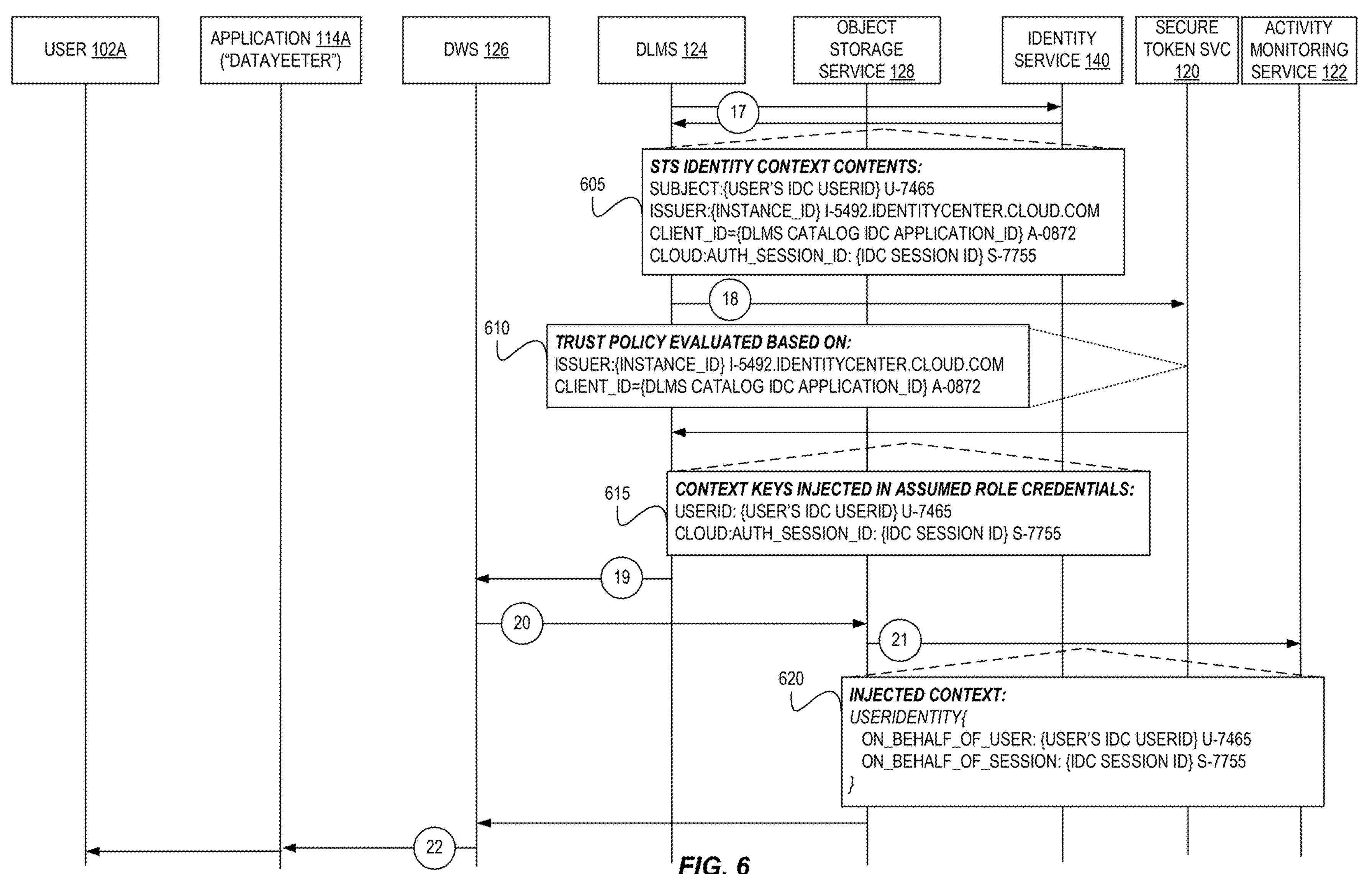
FIG. 6 is a diagram illustrating a use of a passed identity to access resources in a token exchange system for auditable identity propagation according to some examples.

Example walkthroughs of a more complex configuration are now provided with regard to FIG. 4, FIG. 5, and FIG. 6. To begin, FIG. 4 is a diagram illustrating a connection establishment phase of use of a token exchange system for auditable identity propagation according to some examples. FIG. 5 is a diagram illustrating a grant establishment phase of use of a token exchange system for auditable identity propagation according to some examples. FIG. 6 is a diagram illustrating a use of a passed identity to access resources in a token exchange system for auditable identity propagation according to some examples.

In this example scenario, an end-user, "Alice", using their IdP credentials, accesses "DataYeeter", an example customer-operated application (e.g., an analytics tool), to connect to a data warehouse cluster. Alice then uses DataYeeter to connect and execute a query on the data warehouse, referencing a table managed by a data lake management service, with the underlying data in an object storage service and associated metadata (schema/grants) in a data catalog service (e.g., AWS Glue™). The customer administrator has fine-grained policies defined in the data lake management service that they want enforced based on the end-user accessing the resource—e.g., anyone in the enterprise group "L7+ Finance" can query the data lake management service table named "finance reports".

This example assumes several configuration steps have been completed. The objective is for the customer administrator to connect their identities with the cloud provider, and to declare the applications and cloud services that are identity-aware, and the topology for what edges can transmit the end-user's context. First, that the customer has an identity service instance provisioned and shared with the accounts in which the data lake cluster and data warehouse catalog reside. Second, that the customer's identity provider is connected to the identity service instance as an Authentication provider and the users/groups (including the end-user performing the request) are being synchronized into the identity service instance. Third, that the customer has registered the data warehouse cluster as an application in their identity service instance and registered their application's identity provider token issuer as an external token verifier for the application. Fourth, that the customer has registered the data lake service's catalog as an application in their identity service instance, and provisioned a trust relationship on the data warehouse cluster to be able to pass on-behalf-of user context to the data lake management service (e.g., via OAuth scopes—"sts:identity_context" to be able to fetch signed IdC context to pass to the secure token service (STS), and "app:${DataLakeApp.Id}:datalake:iam_auth" to authorize passing end-user identity enhanced STS credentials to the data lake management service).

In FIG. 4, at (1) the user (e.g., via a non-illustrated computing device) loads the DataYeeter application, and at (2) the DataYeeter application redirects with an authentication request. Thereafter, responsive to a credential prompt, Alice responds with a credential (e.g., password, one-time-password, etc.). The user's computing device, at (3), authenticates with the identity provider 110A using the provided credentials. In response at (4) the identity provider 110A sends a response to redirect the user to the DataYeeter application with a signed access token. This token 650 includes a subject including the user's username, an issuer value associated with the identity provider 110A, and an audience value indicating that the token is generated for the application 114A DataYeeter. At (5), the user then accesses the application 114A DataYeeter using the identity provider 110A issued token. The user then initiates a connection from the application (DataYeeter) to a DWS 126 resource (e.g., a cluster).

At (6), the DataYeeter user application exchanges the identity provider 110A token with the identity service 140 for an identity service-issued token 655, which includes as subject the user's identity service user ID (here, "U-7465"), as an issuer an identifier of the instance of the identity service, and an audience value identifying an application ID of the application (here, "A4683").

At (7), the DataYeeter application 114A exchanges the identity service 140 vended token for an access token 660 for the downstream DWS 126 application. The access token 660 includes as subject the user's IdC user ID (here, "U-7465"), as an issuer an identifier of the instance of the identity service, have an audience a value (here, "A-6854") indicating an application ID associated with the DWS 126, and as an authorized party the value identifying an application ID of the application (here, "A4683").

At (8), the DataYeeter user application initiates a connection with the DWS, and at (9), the TWS queries user attributes and group memberships from the identity service 140 to authorize the caller, which is returned. At (10), the connection is established (after a successful authorization on the part of the DWS 126).

Accordingly, the exchanging of an external identity provider 110A token at the cloud perimeter occurs by DataYeeter at (6) where an identity provider 110A issued token for DataYeeter is exchanged for an identity service 140 issued access token, which it can use for identity passing to downstream cloud services. Further, the passing of identity via OAuth access tokens is shown by the DataYeeter application 114A at (7) to exchange the identity service 140 issued access token for its audience for an access token to present to the DWS 126. Additionally, the use of the token context to fetch user/group data for fine-grained access control is shown at (9), where the DWS authorizes that the user has the required cluster grants.

Continuing on to FIG. 5, at (11) via the DataYeeter application 114A, the user seeks to execute a query in the DWS 126 using a resource (e.g., data of a table) managed by a data lake management service, DLMS 124. At (12), The DWS 126 exchanges its access token with the identity service 140 for a secure token service-provided identity context. The returned context 705 includes as a subject the users identity service 140 user ID, as an issuer an instance identifier of the identity service, as an audience a DLMS 124 application identifier, and as an auth session ID, a session identifier tracked by the identity service 140.

At (13), the DWS 126 issues an "assume role" call provided by the STS 120 with a customer managed role registered to the DWS 126 cluster, presenting the identity service 140 vended identity context. At 510, the trust policy is evaluated based on the issuer and the audience as shown by box 710, and context keys are injected (per box 715) in the assumed role credentials including as a user ID, the user's identity service 140 user ID, and as a cloud auth session ID, the associated identity service 140 tracked session ID.

At (14), the DWS 126 calls the DLMS 124 credential broker with the STS credentials. At (15), the DLMS 124 exchanges the STS 120 credentials for an identity service 140 token 720 for its audience. The identity service 140 token 720 includes as the subject the user's identity service 140 user ID, as the issuer an identifier of an instance of the identity service, and as an audience an application ID from the identity service 140 of the DWS 126 cluster. At (16), the DLMS 124 loads user attributes and group memberships for the user and authorizes the user and application for the resource being accessed.

Thus, FIG. 5 illustrates several flows, such as identity Passing via SigV4 Credentials, which is exercised by the DWS 126 at (12) and (13) to augment its customer-managed role for accessing the DLMS 124, with on-behalf-of end-user context. This context is later unpacked by the DLMS 124 at (15) to get the on-behalf end-user's identifier. Another flow includes using the token context to fetch User/Group data for fine-grained access control, which is exercised by DLMS 124 at (16) based on the end-user's context derived at (15). The user attributes, and group membership details are used by the DLMS 124 to perform fine grained access control authorization for the resource being accessed.

Continuing to FIG. 6, at (17) the DLMS 124 requests an STS 120 identity context 605 from the identity service 140, which includes as a subject the user's identity service 140 user ID, as an issuer an instance identifier of the identity service 140, as a client identifier and application ID from the identity service 140 of the DLMS 124 catalog, and as a cloud session ID a session identifier of the identity service 140. At (18), the DLMS 124 issues an assumeRole call to the STS 120 with a customer managed role registered to the catalog, presenting the identity service 140 vended identity context. As shown at 610, this policy is evaluated based on the provider to issuer and client ID (per box 610), and context keys are injected into the assumed role credentials 615 including as a user ID, the users identity service 140 user ID; and as a cloud session ID, the identity service 140 session ID.

At (19), the DLMS 124 vends credentials enhanced with on-behalf-of end-user contact back to the DWS 126. At (20), The DWS 126 accesses the needed resource (e.g., gets an object) from the object storage service 128 using the vended credentials. At (21), the object storage service 128, via use of a logger module, extracts the on-behalf-of user context and injects the context (shown at box 620) into event records that are sent to and stored by the activity monitoring service 122. This injected context 620 is shown as including a user identity block, including a "on behalf of user" value and a "on behalf of session" value. Upon the resource being accessed (here, an object being returned to the DWS 126), at circle (22) a response is returned with query results.

Thus, FIG. 6 illustrates multiple types of flows, such as identity passing via SigV4 Credentials, which is exercised by the DLMS 124 at (17) and (18) to augment its customer-managed role for vending object storage service 128 credentials for accessing object storage service 128 objects. Another flow shown is activity monitoring service 122 logging for end-user context, which is exercised by the object storage service's logger at (21) to extract end-user context from the session credentials presented by the DLMS 124, to inject on-behalf-of context into the object storage service's data plane event records emitted to and stored by the activity monitoring service.

Accordingly, as illustrated in FIG. 4-6, the DataYeeter user application 114A authenticated this user 102A using the customer's choice of identity provider with their existing corporate credentials. The DWS 126, in turn, knew who this user is when the DataYeeter application 114A connected over JDBC. In turn, the DLMS 124 knew who this user is and made access decisions based on that identity (user attributes, group memberships). Further, the object storage service 128 was able to generate an event (persisted in the activity monitoring service 122) that showed who this user is. Importantly, the end-user's identity stuck with the requests made all along the call chain, including the event logs at the tail-end of the request chain.

FIG. 7 is a diagram illustrating an exemplary introspected access token 710, which may be opaque, and an exemplary identity token 715 according to some examples. The identity token 715 may be vended to a SigV4 service in exchange for STS credentials, and may include an "sts.identity_context" to enable downstream identity passing.

As indicated herein, the PEZ techniques and systems provide a new capability that enables a participating set of services (e.g., cloud and/or customer-managed) to preserve the identity of the user, their permissions, and audit information, transitively along a call chain. As described herein, the trusted token issuer capability is designed to support customer environments to continue to operate with their existing authentication providers. By registering a Trusted Token Issuer, customers are able to establish cross-domain trust between existing authentication providers and the identity service 140 to enable flows that do not require an end-user's interaction.

Moreover, as described herein, OAuth scope management is delegated to enterprise administrators instead of to the involved users themselves. In a typical OAuth flow, the end-user that is performing an action is the one that walks through the consent screen authorizing the scopes (actions) that they want to allow. In some examples described herein, the identity service evolves this model to meet enterprise governance and management needs by delegating the management of these scopes to a central set of administrators within the enterprise. In addition to providing better controls for governance, this also results in a frictionless end-user experience where the scopes are pre-approved and the end-user can, without going through the consent experience, perform the actions they need to perform.

For example, an example use case could involve a call-chain in which an application calls a first receiving application (e.g., a business intelligence (BI) service of a cloud provider) which may in turn call a second receiving application (e.g., a data warehouse service of the cloud provider). In this scenario, different sets of scopes may apply—e.g., a set of scopes allowing the BI service to obtain dashboards or reports, and another set of scopes allowing the data warehouse service to access particular user data. Thus, to begin a task, instead of the user needing to consent to (or approve) the first set of scopes, only to then have to consent to (or approve) a second set of scopes, examples disclosed herein can allow a separate user (e.g., an administrator) to configure both sets of scopes in advance, allowing for easier use on the part of the user (who no longer needs to review and authorize scopes and can thus immediately begin their task) and the benefit of governed control on the part of the administrative user.

FIG. 8 is a flow diagram illustrating operations 800 of a method for auditable transitive user identity propagation according to some examples. Some or all of the operations 800 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 800 are performed by the identity service 140 and/or applications of the other figures.

The operations 800 include, at block 810, performing, by an identity service of a cloud provider network, one or more token exchanges with a first application. Block 810 includes block 812 and receiving a first access token from the first application, the first access token including a first user identifier associated with a user. Block 810 also includes block 814 and verifying that the user is authorized to access a second application. Block 810 includes block 816 and transmitting a second access token to the first application, the second access token including a second user identifier that is also associated with the user.

The operations 800 further include, at block 820, receiving, by a second application from the first application, a request to access a resource, wherein the request includes the second access token. The operations 800 further include, at block 830, determining, by the second application based on use of the second access token, that the user is authorized to access the resource. The operations 800 further include, at block 840, providing, by the second application, the access to the resource.

FIG. 9 is a flow diagram illustrating operations of a method for cross-domain identity trust using trusted token issuers according to some examples. Some or all of the operations 900 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 900 are performed by the identity service 140 of the other figures.

The operations 900 include, at block 910, receiving, at an identity service of a cloud provider network, one or more requests to register a trusted token issuer (TTI) with the identity service, the request providing a resource identifier associated with the TTI and further including mapping information identifying an attribute from TTI-issued tokens and a corresponding attribute from an identity datastore of the identity service, wherein the TTI is external to the cloud provider network.

The operations 900 further include, at block 920, receiving, at the identity service from an application, a request to exchange a first token generated by the TTI with a second token to be generated by the identity service, wherein the first token is associated with a first user account of a directory of the TTI.

The operations 900 further include, at block 930, generating the second token based at least in part on the mapping information, wherein the second token includes or is based on an identifier of a second user account of the identity datastore. The operations 900 further include, at block 940, transmitting the second token to the application.

FIG. 10 is a flow diagram illustrating operations of a method for authorization scope management delegation according to some examples. Some or all of the operations 1000 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1000 are performed by the identity service 140 and/or applications of the other figures.

The operations 1000 include, at block 1010, receiving, at an identity service of a cloud provider network, one or more requests originated in association with a first user to define access scope information, for at least a second user, pertaining to a first application of the cloud provider network, wherein the access scope information provides at least a first scope value identifying a type of access to the first application that is allowed for the second user or a group to which the second user belongs.

The operations 1000 further include, at block 1020, receiving, at the first, a request to access a resource of the first application that was originated on behalf of the second user, wherein the request includes an access token generated by an identity provider based on an authorization of the second user.

The operations 1000 further include, at block 1030, determining that the request to access the resource is authorized based at least in part on the access token and a determination that the first scope value permits a type of the requested access. The operations 1000 further include, at block 1040, providing, by the first application, the access to the resource.

Figure 11:
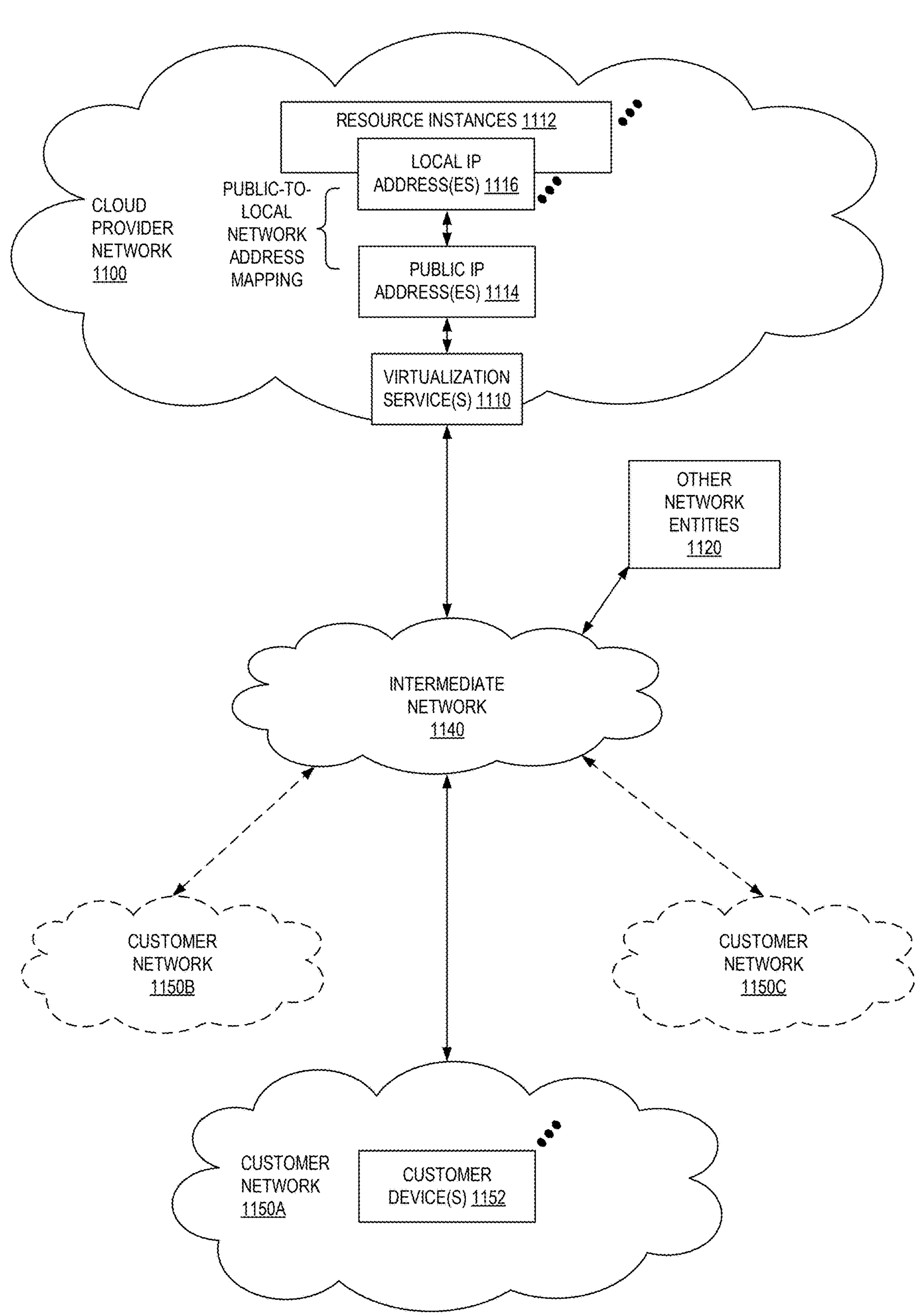
FIG. 11 illustrates an example cloud provider network environment according to some examples.

FIG. 11 illustrates an example provider network (or "service provider system") environment according to some examples. A provider network 1100 can provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 can be associated with the resource instances 1112; the local IP addresses are the internal network addresses of the resource instances 1112 on the provider network 1100. In some examples, the provider network 1100 can also provide public IP addresses 1114 and/or public IP address ranges (e.g., Internet Protocol version 4 (IPv4) or Internet Protocol version 6 (IPv6) addresses) that customers can obtain from the provider 1100.

Conventionally, the provider network 1100, via the virtualization services 1110, can allow a customer of the service provider (e.g., a customer that operates one or more customer networks 1150A-1150C (or "client networks") including one or more customer device(s) 1152) to dynamically associate at least some public IP addresses 1114 assigned or allocated to the customer with particular resource instances 1112 assigned to the customer. The provider network 1100 can also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of the customer network(s) 1150A-1150C can, for example, implement customer-specific applications and present the customer's applications on an intermediate network 1140, such as the Internet. Other network entities 1120 on the intermediate network 1140 can then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 can be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1100; a customer can then assign their allocated public IP addresses to particular resource instances allocated to the customer. These public IP addresses can be referred to as customer public IP addresses, or simply customer IP addresses. Instead of being assigned by the provider network 1100 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
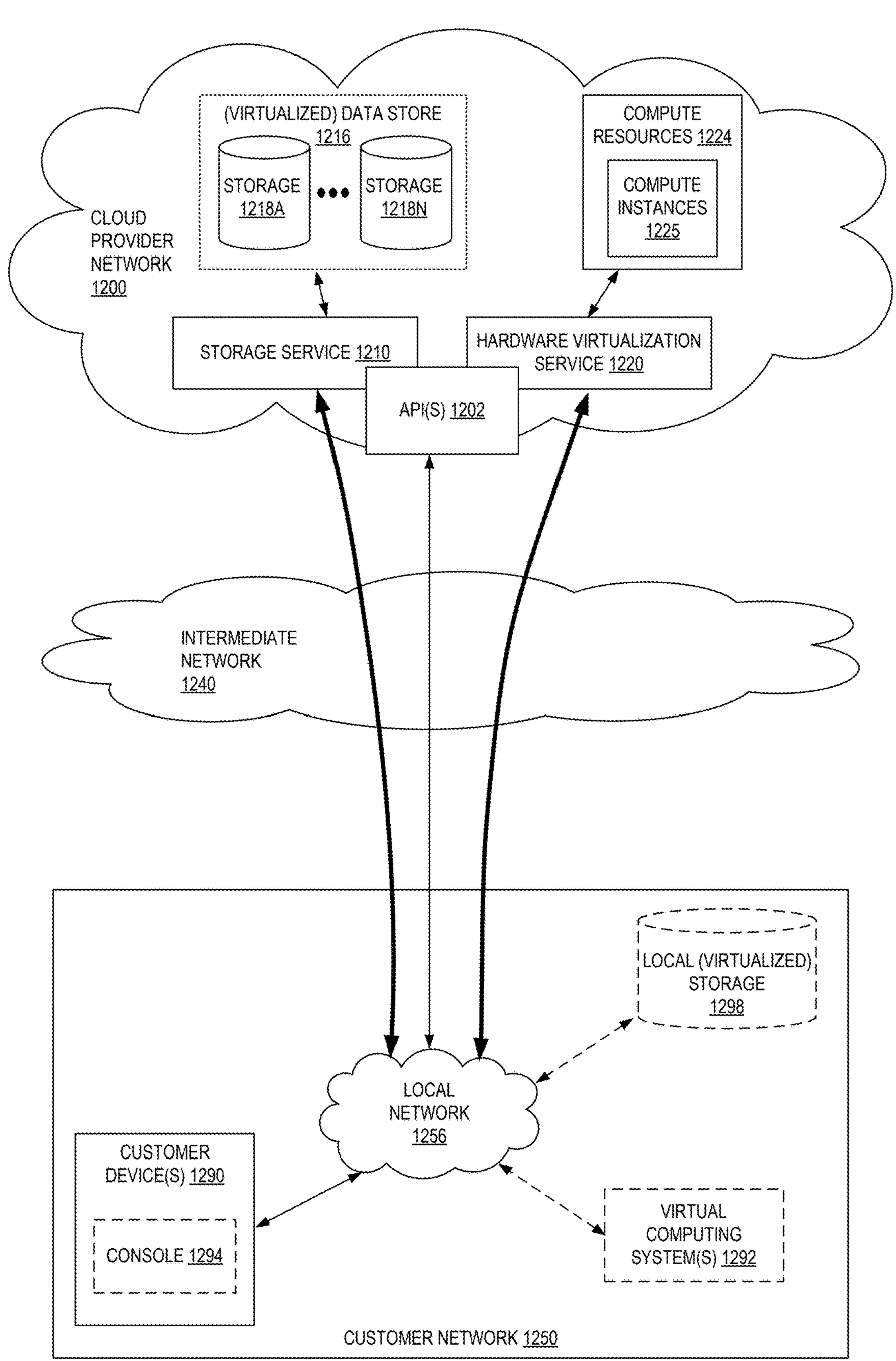
FIG. 12 is a block diagram of an example cloud provider network that provides a storage service and a hardware virtualization service to customers according to some examples.

FIG. 12 is a block diagram of an example provider network environment that provides a storage service and a hardware virtualization service to customers, according to some examples. A hardware virtualization service 1220 provides multiple compute resources 1224 (e.g., compute instances 1225, such as VMs) to customers. The compute resources 1224 can, for example, be provided as a service to customers of a provider network 1200 (e.g., to a customer that implements a customer network 1250). Each computation resource 1224 can be provided with one or more local IP addresses. The provider network 1200 can be configured to route packets from the local IP addresses of the compute resources 1224 to public Internet destinations, and from public Internet sources to the local IP addresses of the compute resources 1224.

The provider network 1200 can provide the customer network 1250, for example coupled to an intermediate network 1240 via a local network 1256, the ability to implement virtual computing systems 1292 via the hardware virtualization service 1220 coupled to the intermediate network 1240 and to the provider network 1200. In some examples, the hardware virtualization service 1220 can provide one or more APIs 1202, for example a web services interface, via which the customer network 1250 can access functionality provided by the hardware virtualization service 1220, for example via a console 1294 (e.g., a web-based application, standalone application, mobile application, etc.) of a customer device 1290. In some examples, at the provider network 1200, each virtual computing system 1292 at the customer network 1250 can correspond to a computation resource 1224 that is leased, rented, or otherwise provided to the customer network 1250.

From an instance of the virtual computing system(s) 1292 and/or another customer device 1290 (e.g., via console 1294), the customer can access the functionality of a storage service 1210, for example via the one or more APIs 1202, to access data from and store data to storage resources 1218A-1218N of a virtual data store 1216 (e.g., a folder or "bucket," a virtualized volume, a database, etc.) provided by the provider network 1200. In some examples, a virtualized data store gateway (not shown) can be provided at the customer network 1250 that can locally cache at least some data, for example frequently accessed or critical data, and that can communicate with the storage service 1210 via one or more communications channels to upload new or modified data from a local cache so that the primary store of data (the virtualized data store 1216) is maintained. In some examples, a user, via the virtual computing system 1292 and/or another customer device 1290, can mount and access virtual data store 1216 volumes via the storage service 1210 acting as a storage virtualization service, and these volumes can appear to the user as local (virtualized) storage 1298.

While not shown in FIG. 12, the virtualization service(s) can also be accessed from resource instances within the provider network 1200 via the API(s) 1202. For example, a customer, appliance service provider, or other entity can access a virtualization service from within a respective virtual network on the provider network 1200 via the API(s) 1202 to request allocation of one or more resource instances within the virtual network or within another virtual network.

Illustrative Systems

Figure 13:
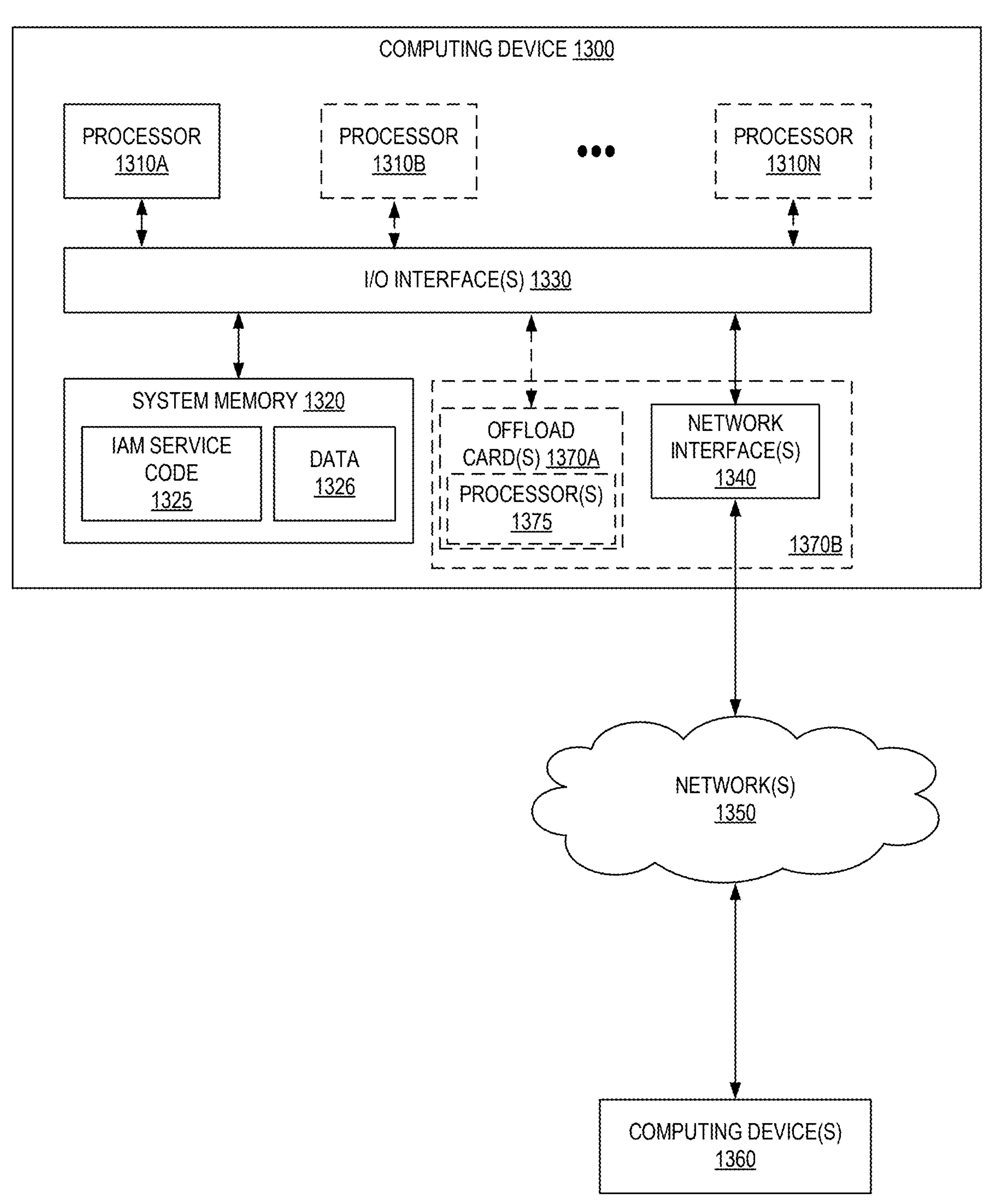
FIG. 13 is a block diagram illustrating an example computing device that can be used in some examples.

In some examples, a system that implements a portion or all of the techniques described herein can include a general-purpose computer system, such as the computing device 1300 (also referred to as a computing system or electronic device) illustrated in FIG. 13, that includes, or is configured to access, one or more computer-accessible media. In the illustrated example, the computing device 1300 includes one or more processors 1310 coupled to a system memory 1320 via an input/output (I/O) interface 1330. The computing device 1300 further includes a network interface 1340 coupled to the I/O interface 1330. While FIG. 13 shows the computing device 1300 as a single computing device, in various examples the computing device 1300 can include one computing device or any number of computing devices configured to work together as a single computing device 1300.

In various examples, the computing device 1300 can be a uniprocessor system including one processor 1310, or a multiprocessor system including several processors 1310 (e.g., two, four, eight, or another suitable number). The processor(s) 1310 can be any suitable processor(s) capable of executing instructions. For example, in various examples, the processor(s) 1310 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1310 can commonly, but not necessarily, implement the same ISA.

The system memory 1320 can store instructions and data accessible by the processor(s) 1310. In various examples, the system memory 1320 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1320 as IAM service code 1325 (e.g., executable to implement, in whole or in part, the IAM service 108) and data 1326.

In some examples, the I/O interface 1330 can be configured to coordinate I/O traffic between the processor 1310, the system memory 1320, and any peripheral devices in the device, including the network interface 1340 and/or other peripheral interfaces (not shown). In some examples, the I/O interface 1330 can perform any necessary protocol, timing, or other data transformations to convert data signals from one component (e.g., the system memory 1320) into a format suitable for use by another component (e.g., the processor 1310). In some examples, the I/O interface 1330 can include support for devices attached through various types of peripheral buses, such as a variant of the Peripheral Component Interconnect (PCI) bus standard or the Universal Serial Bus (USB) standard, for example. In some examples, the function of the I/O interface 1330 can be split into two or more separate components, such as a north bridge and a south bridge, for example. Also, in some examples, some or all of the functionality of the I/O interface 1330, such as an interface to the system memory 1320, can be incorporated directly into the processor 1310.

The network interface 1340 can be configured to allow data to be exchanged between the computing device 1300 and other computing devices 1360 attached to a network or networks 1350, such as other computer systems or devices as illustrated in FIG. 1, for example. In various examples, the network interface 1340 can support communication via any suitable wired or wireless general data networks, such as types of Ethernet network, for example. Additionally, the network interface 1340 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1300 includes one or more offload cards 1370A or 1370B (including one or more processors 1375, and possibly including the one or more network interfaces 1340) that are connected using the I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1300 can act as a host electronic device (e.g., operating as part of a hardware virtualization service) that hosts compute resources such as compute instances, and the one or more offload cards 1370A or 1370B execute a virtualization manager that can manage compute instances that execute on the host electronic device. As an example, in some examples the offload card(s) 1370A or 1370B can perform compute instance management operations, such as pausing and/or un-pausing compute instances, launching and/or terminating compute instances, performing memory transfer/copying operations, etc. These management operations can, in some examples, be performed by the offload card(s) 1370A or 1370B in coordination with a hypervisor (e.g., upon a request from a hypervisor) that is executed by the other processors 1310A-1310N of the computing device 1300. However, in some examples the virtualization manager implemented by the offload card(s) 1370A or 1370B can accommodate requests from other entities (e.g., from compute instances themselves), and can not coordinate with (or service) any separate hypervisor.

In some examples, the system memory 1320 can be one example of a computer-accessible medium configured to store program instructions and data as described above. However, in other examples, program instructions and/or data can be received, sent, or stored upon different types of computer-accessible media. Generally, a computer-accessible medium can include any non-transitory storage media or memory media such as magnetic or optical media, e.g., disk or DVD/CD coupled to the computing device 1300 via the I/O interface 1330. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1300 as the system memory 1320 or another type of memory. Further, a computer-accessible medium can include transmission media or signals such as electrical, electromagnetic, or digital signals, conveyed via a communication medium such as a network and/or a wireless link, such as can be implemented via the network interface 1340.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., “NoSQL”), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1218A-1218N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

connecting an identity provider with an identity service of a cloud provider network as an authentication provider;

syncing user information from the identity provider to the identity service;

performing, by the identity service, an identity-propagation operation including one or more token exchanges with a first application, comprising:

receiving, from the first application, a first request to perform a token exchange, the first request including a first access token generated by the identity provider, the first access token including a subject value comprising a first user identifier associated with a user and an audience value comprising a first identifier of the first application;

exchanging the first access token with a second access token issued by the identity service, comprising:

mapping the first user identifier from the first access token, via the synced user information, to a second user identifier utilized within the cloud provider network, and generating and transmitting the second access token to the first application, the second access token including, as the subject value, the second user identifier and, as the audience value, a second identifier of the first application;

receiving, from the first application, a second request to perform a token exchange to swap the second access token for a third access token for a second application to be utilized by the first application on behalf of the user, the second request including the second access token;

verifying, based in part on the second user identifier from the second access token and configuration maintained for a second application, that the user is authorized to access the second application, and exchanging the second access with the third access token, comprising generating and transmitting the third access token to the first application, the third access token including as the subject value, the second user identifier associated with the user and, as the audience value, an identifier of the second application;

receiving, by the second application from the first application, a request to access a resource, wherein the request includes the third access token;

determining, by the second application based on use of the third access token, that the user is authorized to access the resource; and providing, by the second application, the access to the resource.

2. The computer-implemented method of claim 1, wherein the first application is external to the cloud provider network, and wherein the first access token was generated by an identity provider that is also external to the cloud provider network.

3. The computer-implemented method of claim 2, wherein:

the first user identifier is utilized within a first directory of the identity provider;

the second user identifier is utilized within a second directory of the identity service; and the first user identifier is not the same as the second user identifier.

4. A computer-implemented method comprising:

performing, by an identity service of a cloud provider network, an identity-propagation operation with a first application, comprising:

receiving a first identity information from the first application, the first identity information being generated by an identity provider and including a first user identifier associated with a user, mapping the first user identifier to a second user identifier utilized within the cloud provider network, wherein the second user identifier is different than the first user identifier and was not provided in the first identity information, verifying, by the identity service, that the user is authorized to access a second application based at least in part on configuration maintained for the second application, and transmitting, to the first application, a second identity information issued by the identity service including the second user identifier;

receiving, by the second application from the first application, a request to access a resource, wherein the request includes the second identity information issued by the identity service;

determining, by the second application based on use of the second identity information issued by the identity service, that the user is authorized to access the resource; and providing, by the second application, the access to the resource.

5. The computer-implemented method of claim 4, wherein the first application is external to the cloud provider network, and wherein the first identify information comprises a first access token generated by the identity provider that is also external to the cloud provider network.

6. The computer-implemented method of claim 5, wherein:

the first user identifier is utilized within a first directory of the identity provider;

the second user identifier is utilized within a second directory of the identity service; and the first user identifier is not valid for the user within the cloud provider network.

7. The computer-implemented method of claim 5, wherein the identity-propagation operation further includes:

obtaining a public key associated with the identity provider; and utilizing the public key to verify that the first access token is legitimate.

8. The computer-implemented method of claim 5, further comprising:

receiving a request to register the first application with the identity service, wherein the request provides configuration information associated with the identity provider; and receiving a request to configure the second application for identity propagation.

9. The computer-implemented method of claim 4, further comprising:

receiving a request to map a first attribute associated with the first application with a second attribute associated with the identity service; and storing mapping information indicative of a mapping between the first attribute and the second attribute, wherein the mapping of the first user identifier to the second user identifier includes utilizing the mapping information to identify the second user identifier based at least in part on use of the first user identifier.

10. The computer-implemented method of claim 4, wherein the second identity information comprises an access token that includes an audience value identifying the second application.

11. The computer-implemented method of claim 4, wherein determining that the user is authorized to access the resource comprises:

sending, by the second application, a request to the identity service to obtain data associated with the user; and generating an access control decision based on the data.

12. The computer-implemented method of claim 11, wherein the data further comprises group membership information associated with the user.

13. The computer-implemented method of claim 4, wherein the first identity information received from the first application and the second identity information issued by the identity service comprise OAuth compliant tokens.

14. The computer-implemented method of claim 4, further comprising:

recording, by a monitoring service of the cloud provider network, an activity event indicative of the providing of the access to the resource, the activity event including a user identifier derived from the second identity information issued by the identity service.

15. A system comprising:

a first one or more computing devices to implement an identity service in a multi-tenant cloud provider network, the identity service including instructions that upon execution cause the identity service to:

perform an identity-propagation operation with a first application, comprising:

receiving a first identity information from the first application, the first identity information being generated by an identity provider and including a first user identifier associated with a user, mapping the first user identifier to a second user identifier utilized within the cloud provider network, wherein the second user identifier is different than the first user identifier and was not provided in the first identity information, verifying that the user is authorized to access a second application based at least in part on configuration maintained for the second application, and transmitting a second identity information issued by the identity service to the first application, the second access token including the second user identifier; and a second one or more computing devices to implement the second application in the multi-tenant cloud provider network, the second application including instructions that upon execution cause the second application to:

receive, from the first application, a request to access a resource, wherein the request includes the second identity information issued by the identity service;

determine, based on use of the second identity information, that the user is authorized to access the resource; and provide, by the second application, the access to the resource.

16. The system of claim 15, wherein the first application is external to the cloud provider network, and wherein the first identity information comprises an access token generated by an identity provider that is also external to the cloud provider network.

17. The system of claim 16, wherein:

the first user identifier is utilized within a first directory of the identity provider;

the second user identifier is utilized within a second directory of the identity service; and the first user identifier is not valid for the user within the cloud provider network.

18. The system of claim 16, wherein the one or more token exchanges further include:

obtaining a public key associated with the identity provider; and utilizing the public key to verify that the first access token is legitimate.

19. The system of claim 16, wherein the identity service further includes instructions that upon execution cause the identity service to:

receive a request to register the first application with the identity service, wherein the request provides configuration information associated with the identity provider; and receive a request to configure the second application for identity propagation.

20. The system of claim 15, wherein the identity service further includes instructions that upon execution cause the identity service to:

receive a request to map a first attribute associated with the first application with an second attribute associated with the identity service; and store mapping information indicative of a mapping between the first attribute and the second attribute, wherein the mapping of the first user identifier to the second user identifier includes utilizing the mapping information to identify the second user identifier based at least in part on use of the first user identifier.

* * * * *